(12) United States Patent
Liang et al.

(10) Patent No.: US 12,458,634 B2
(45) Date of Patent: Nov. 4, 2025

(54) STABILIZED LIQUID FORMATIONS CONTAINING PICOSULFATE

(71) Applicant: Ferring B.V., Hoofddorp (NL)

(72) Inventors: Alfred Chi-Yeh Liang, Rahway, NJ (US); Nipul Ghanshyambhai Patel, Avenel, NJ (US)

(73) Assignee: Ferring B.V., Hoofddorp (NL)

( * ) Notice: Subject to any disclaimer, the term of this patent is extended or adjusted under 35 U.S.C. 154(b) by 194 days.

(21) Appl. No.: 17/555,277

(22) Filed: Dec. 17, 2021

(65) Prior Publication Data

US 2022/0370427 A1 Nov. 24, 2022

Related U.S. Application Data

(63) Continuation of application No. 15/643,727, filed on Jul. 7, 2017, now abandoned.

(60) Provisional application No. 62/360,188, filed on Jul. 8, 2016.

(51) Int. Cl.
| | | |
|---|---|---|
| A61K 31/4402 | (2006.01) | |
| A61K 9/08 | (2006.01) | |
| A61K 33/06 | (2006.01) | |
| A61K 47/02 | (2006.01) | |
| A61K 47/10 | (2017.01) | |
| A61K 47/12 | (2006.01) | |
| A61K 47/22 | (2006.01) | |
| A61K 47/26 | (2006.01) | |
| A61K 47/38 | (2006.01) | |

(52) U.S. Cl.
CPC .......... *A61K 31/4402* (2013.01); *A61K 9/08* (2013.01); *A61K 33/06* (2013.01); *A61K 47/02* (2013.01); *A61K 47/10* (2013.01); *A61K 47/12* (2013.01); *A61K 47/22* (2013.01); *A61K 47/26* (2013.01); *A61K 47/38* (2013.01)

(58) Field of Classification Search
CPC ...... A61K 31/4402; A61K 9/08; A61K 33/06; A61K 47/02; A61K 47/10; A61K 47/12; A61K 47/22; A61K 47/26; A61K 47/38
See application file for complete search history.

(56) References Cited

U.S. PATENT DOCUMENTS

| | | | |
|---|---|---|---|
| 5,010,069 A * | 4/1991 | Bottom | A61K 9/0031 514/474 |
| 5,215,769 A | 6/1993 | Fox et al. | |
| 5,498,425 A | 3/1996 | Wood et al. | |
| 8,450,338 B2 | 5/2013 | Xu et al. | |
| 8,481,083 B2 | 7/2013 | Xu et al. | |
| 9,827,231 B2 | 11/2017 | Nam | |
| 10,624,879 B2 | 4/2020 | Nam et al. | |
| 11,191,753 B2 | 12/2021 | Nam et al. | |
| 2013/0018223 A1 | 1/2013 | Joseph et al. | |
| 2013/0149390 A1 | 6/2013 | Gorelick et al. | |
| 2015/0072014 A1 | 3/2015 | Essakimuthu et al. | |
| 2017/0049758 A1 | 2/2017 | Liang et al. | |
| 2018/0015078 A1 | 1/2018 | Liang et al. | |
| 2018/0235947 A1 | 8/2018 | Nam et al. | |

FOREIGN PATENT DOCUMENTS

| | | |
|---|---|---|
| CA | 2942878 | 9/2015 |
| EP | 0 401 096 A | 12/1990 |
| IN | 1605/ | 11/2008 |
| JP | S5697248 | 8/1981 |
| JP | H04-234960 A | 8/1992 |
| JP | 2557111 B | 11/1996 |
| JP | H10-327805 A | 12/1998 |
| JP | H11-299454 A | 11/1999 |
| JP | 2002-010765 A | 1/2002 |
| KR | 101155099 B1 | 6/2012 |
| KR | 1420315 B1 * | 7/2014 |
| KR | 2015-0016666 A | 2/2015 |
| RU | 2342928 C2 | 1/2009 |
| RU | 2353412 C2 | 4/2009 |
| RU | 2473332 C2 | 1/2013 |
| RU | 2482850 C2 | 5/2013 |
| WO | WO-91/19692 A2 | 12/1991 |
| WO | WO-01/66083 A1 | 9/2001 |
| WO | WO-2011/078828 A1 | 6/2011 |
| WO | WO-2011/142731 A2 | 11/2011 |
| WO | WO-2012/102799 A2 | 8/2012 |
| WO | WO-2014/016671 A2 | 1/2014 |
| WO | WO-2014/032108 A1 | 3/2014 |
| WO | WO-2015/141897 A1 | 9/2015 |
| WO | WO-2017/031121 A1 | 2/2017 |

OTHER PUBLICATIONS

Anonymous. ChEBI [online]; updated Apr. 12, 2016; downloaded from <URL https://www.ebi.ac.uk/chebi/searchid.do?chebild=CHEBI:114786 > on Oct. 25, 2019; 4 pages. (Year: 2016).*
"Guidance for Industry: Q1A(R2) Stability Testing of New Drug Substance and Products," FDA (Nov. 2003).
"Malic Acid," Handbook of Pharmaceutical Excipients, Sixth Edition, Edited by RC Rowe, PJ Sheskey and ME Quinn; Pharmaceutical Press, pp. 411-413 (2009).
"Sodium Picosulfate, Magnesium Oxide, and Anhydrous Citric Acid (PREPOPIK) for Oral Solution," National Drug Monograph (Jun. 2013) Available online, URL: <https://www.pbm.va.gov/clinicalguidance/drugmonographs/PicosulfateMagnesiumOxideCitricAcidPREPOPIKMonograph.pdf>.

(Continued)

*Primary Examiner* — David Browe
(74) *Attorney, Agent, or Firm* — Foley & Lardner LLP

(57) ABSTRACT

Oral liquid formulations are provided containing sodium picosulfate, magnesium citrate, citric acid, malic acid, and an antioxidant selected from potassium metabisulfite and sodium metabisulfite, wherein the antioxidant is present in the composition at a concentration of from about 0.002 M to about 0.1 M, and wherein the composition has a pH of from about 4.0 to about 6.5.

15 Claims, 1 Drawing Sheet

(56) References Cited

OTHER PUBLICATIONS

"Sodium picosulfate," Wikipedia, obtained online, URL: <https://en.wikipedia.org/wiki/Sodium_picosulfate> (downloaded May 2019).
"UKPAR, Sodium Picosulfate 5mg/5ml Oral Solution, PL 17496/0022" Medicines & Healthcare Products Regulatory Agency, (2007).
Albugeaey et al., Tu1037 How Bad Was That Bowel Prep? Results of a Patient Questionnaire Survey at a University Center, Gas? ozntestinal Endoscopy, 2013, 83(5 Suppl.), p. AB539.
Anonymous. Alginates. Technical Evaluation Report Compiled by the OMRI for the USDA Natinoal Organic Program. Organic Materials Review Institute [online]; 2015; published Feb. 5, 2015; donloaded from <URL https://www.ams.usda.gov/sites/default/files/media/alginates%20TR%202015.pdf> 23 pages (2015).
Anonymous., "CHEBI: 114786—sodium disulfite," ChEBI [online]; updated Apr. 12, 2016; downloaded from <URL: https://www.ebi.ac.uk/chebi/searchId.do?chebiId=CHEBI:114786> on Oct. 25, 2019; 4 pages (2016).
Barkun et al., "Commonly Used Preparations for Colonoscopy: Efficacy, Tolerability and Safety—A Canadian Association of Gastroenterology Position Paper," Can. J. Gastroenterol., vol. 20, No. 11, pp. 699-710, (Nov. 2006).
Chakraborty et al., United States Food and Drug Administration, Center for Drug Evaluation and Research, Pharmacology Review(s) for Application No. 21-551, Halflytely, 2012, 24 pp.
Confidential Detailed Factual and Legal Basis for Paragraph IV Certification That U.S. Pat. No. 9,827,231 Is Invalid, Unenforceable, and/or Will Not Be Infringed (Apr. 4, 2019).
Crowley, "Solutions, Emulsions, Suspensions, and Extracts," Remington: The Science and Practice of Pharmacy, 21st Edition, Chapter 39, pp. 745-775.
Database WPI Week 200167, Sep. 13, 2001, Thomson Scientific, London, GB; AN 20001-596804, XP002763710, & WO 01/66083, Sep. 13, 2001.
Database WPI Week 201459, Jul. 17, 2014, Thomson Scientific, London, GB; AN 2014-N7793 | XP002763689,—& KR 101 420 315 K2 (NAM BG) Jul. 17, 2014, abstract.
Database WPI Week 201522, Feb. 13, 2015, Thomson Scientific, London, GB; AN 2015-14706W, XP002763690,—& KR 2015 0016666 KI (Hee Y L), Feb. 13, 2015, abstract.
Drugs.com Prepopik—How does this stuff taste? How much do you have to drink?, https://www.drugs.com/answers/prepopik-bowel-preps-before-unable-finish-simply-58434.html (retrieved Jun. 20, 2017, 3pp) (year 2017).
Du et al., "Comparison of Bowel Preparation Quality With a Bowel Purgative Containing Sodium Picosulfate, Magnesium Oxide and Citric Acid Versus a PEG-ELS Solution: A Prospective RCT in China Using Chinese Language Validated Ottawa Scale," Gastrointestinal Endoscopy, SU1303, vol. 75, No. 4S, p. AB286, (2012).
Duarte et al., "Organic Acids Concentration in Citrus Juice from Conventional versus Organic Farming," Acta horticulturae, 2012; 933: 601-606.
Ducolax Pico Liquid Package Leaflet (Jun. 2013).
European Search Report in Application No. 14886464.8, dated Sep. 18, 2017, 7 pp.
Ferring Pharmaceuticals Inc., Prepopik Highlights of Prescribing Information, Jul. 2012, 13 pp.
Handbook of Pharmaceutical Excipients Sixth Edition, Edited by RC Rowe, PJ Sheskey and ME Quinn; Pharmaceutical Press (2009) (Year: 2009).
International Search Report and Written Opinion in Internation Application No. PCT/US2016/047188, dated Nov. 11, 2016, 13 pages.
International Search Report and Written Opinion in International Application No. PCT/US2017/041047, Mailed on Sep. 29, 2017, 16 Pages.
International Search Report in International Application No. PCT/KR2014/005512, dated Dec. 17, 2014, 13 pp.
Notice of Allowance issued on Mar. 6, 2020, in U.S. Appl. No. 15/822,298 (US 2018-0235947).
Notice of Allowance in U.S. Appl. No. 16/847,608 dated Aug. 5, 2021.
Office Action dated Oct. 30, 2019 in U.S. Appl. No. 15/643,727 (US 2018-0015078).
Office Action issued on Feb. 10, 2021, in U.S. Appl. No. 15/238,408 (US 2017-0049758).
Office Action issued on Jan. 16, 2020 in U.S. Appl. No. 15/238,408 (US 2017-0049758 A1).
Office Action issued on Jul. 27, 2020, in U.S. Appl. No. 15/238,408 (US 2017-0049758).
Office Action issued on Jul. 9, 2020, in U.S. Appl. No. 15/238,408 (US 2017-0049758).
Office Action issued on Mar. 18, 2020, in U.S. Appl. No. 15/643,727 (US 2018-0015078).
Office Action issued on May 28, 2020 in U.S. Appl. No. 15/238,408 (US 2017-0049758).
Office Action mailed on Jul. 10, 2019 in U.S. Appl. No. 15/238,408 (US 2017-0049758 A1).
Patent Trial and Appeal Board Decision in Appeal in U.S. Appl. No. 15/643,727 issued Oct. 21, 2021.
PDR, "Physicians' Desk Reference 2013," 67th Edition (2012), (Prepopik Prescribing Information).
Rabizadeh et al., "Carboxylic acids: effective inhibitors for calcium sulfate precipitation?" Mineralogical Magazine, vol. 78(6), pp. 1465-1472 (Nov. 2014).
Savic et al., "Monitoring of Thermal and Oxidation Stability of Sodium Picosulfate by Modified RP-HPLC Method," Chemical Industry & Chemical Engineering Quarterly 16 (1) pp. 103-110 (2010).
Song et al., Effectiveness of Sodium Picosulfate/Magnesium Citrate (PICO) for Colonoscopy Preparation, Ann Coloproctol 2014, 30(5), 222-227.
Sortwell et al., "Improving the Flavor of Fruit Products with Acidulants," Bartek [online]; 1996; downloaded from <URL http://citeseerx.ist.psu.edu/viewdoc/download?doi=10.1.1.548.4424&rep1&type=pdf> on Jun. 30, 2019; 10 pages (1996).
Suprep Prescribing Information (Aug. 2010).
Third Party Observation dated May 28, 2019 in European Application No. 14886464.8.
Office Action in U.S. Appl. No. 16/847,608 dated Apr. 5, 2021.
Uselton et al., "Assuring Continuous Compliance with Joint Commission Standards: A Pharmacy Guide," Eighth Edition (2010).
Redacted Detailed Factual And Legal Basis for Paragraph IV Certification against U.S. Pat. No. 9,827,231, U.S. Pat. No. 10,624,879; and U.S. Pat. No. 11,191,753, dated May 19, 2025.
Redacted Detailed Factual And Legal Basis for Paragraph IV Certification against U.S. Pat. No. 9,827,231, U.S. Pat. No. 10,624,879; and U.S. Pat. No. 11,191,753, dated Aug. 21, 2025.

* cited by examiner

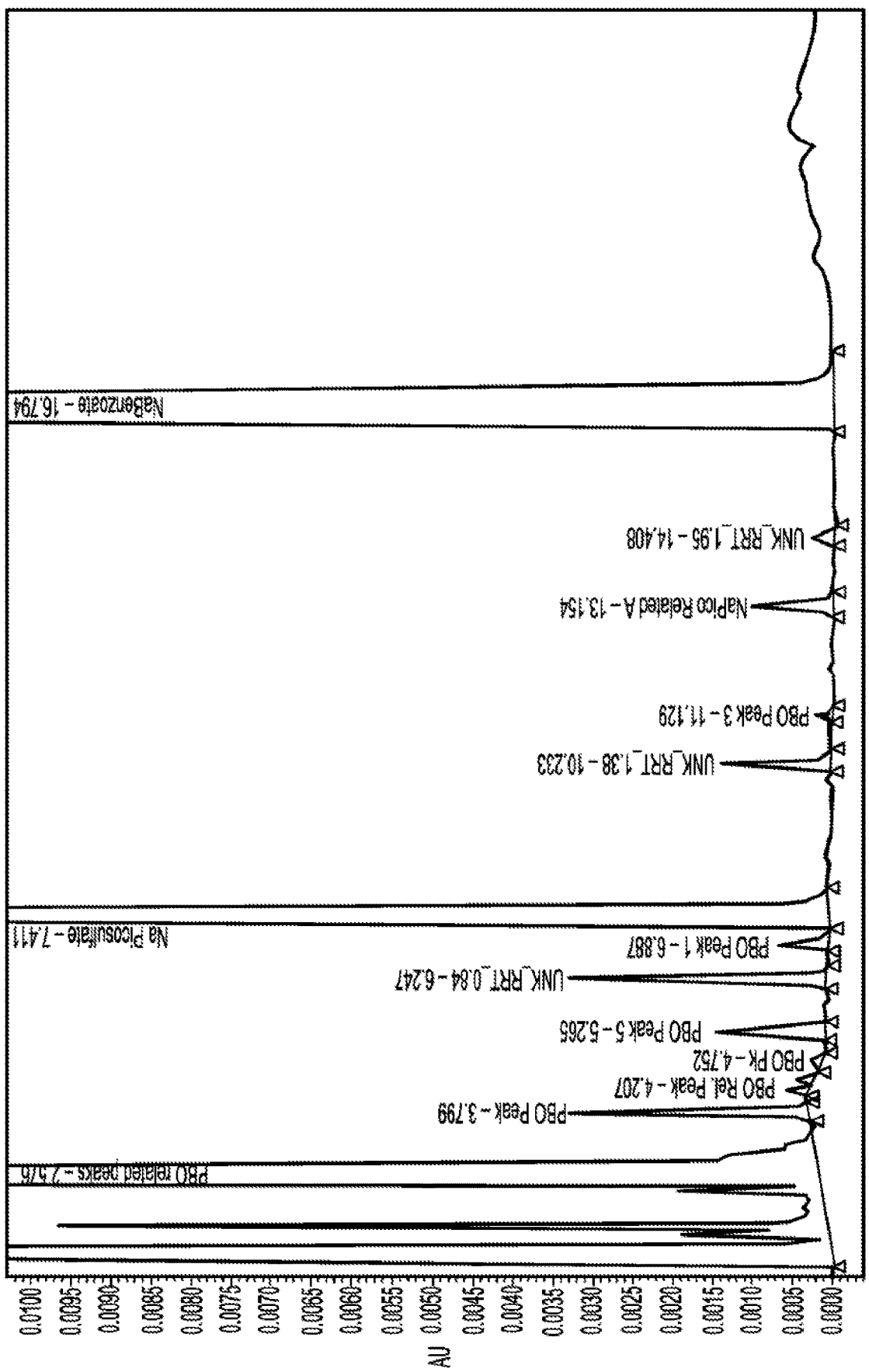

STABILIZED LIQUID FORMATIONS CONTAINING PICOSULFATE

CROSS-REFERENCE TO RELATED APPLICATIONS

This application is a continuation of U.S. application Ser. No. 15/643,727, filed Jul. 7, 2017, which claims the benefit of U.S. Provisional Application No. 62/360,188, filed Jul. 8, 2016, which are incorporated herein by reference in their entirety.

TECHNICAL FIELD

This disclosure relates to liquid formulations useful to treat constipation or for the clearance of the bowel prior to X-ray examination, endoscopy or surgery.

BACKGROUND

Picosulfate, typically used in the form of its bis-sodium salt, sodium picosulfate (I), is a stimulant laxative.

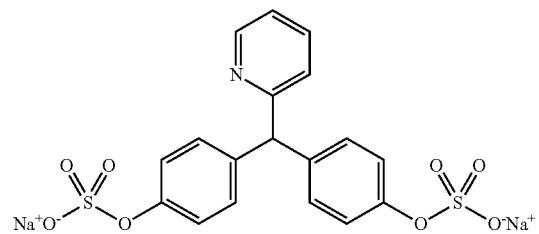

(I)

Sodium picosulfate is a prodrug that itself has no physiological effect. It is metabolized by intestinal bacteria into the active compound, 4,4'-dihydroxydiphenyl-(2-pyridyl)-methane (DPM), which is the stimulant laxative and acts by increasing peristalsis in the intestine.

Pharmaceutical products containing picosulfate in the form of sodium picosulfate can be used to treat constipation or for the clearance of the bowel prior to X-ray examination, endoscopy or surgery. Picosulfate, a stimulant laxative, can be used in combination with an osmotic laxative. Particularly useful are products that contain sodium picosulfate in combination with magnesium oxide and anhydrous citric acid, which together in solution form magnesium citrate, an osmotic laxative with a powerful cathartic effect. Examples of such formulations are sold under the trade names PICO-PREP® and PREPOPIK®. These products contain sodium picosulfate along with magnesium oxide and citric acid in the form of a solid that must be dissolved to be taken orally by the patient and provides a strong laxative that is easily palatable. The products are particularly effective to prepare patients for colonoscopy. In particular, the products include citric acid, magnesium oxide, and sodium picosulfate, as active ingredients, along with potassium bicarbonate, sodium saccharin, and flavoring (e.g., orange flavor).

Existing products containing sodium picosulfate, such as those in combination with magnesium oxide and citric acid do, however, suffer from disadvantages. One is that the formulations do not dissolve immediately. For example, the patient instruction sheet for the PREPOPIK® product instructs the patient to pour the solid contents of a packet of the preparation in 5 fluid ounces (150 mL) of water in a cup, and to stir the resulting mixture for 2-3 min. before drinking the entire contents of the cup. If the patient fails to follow the procedure precisely, e.g., by failing to stir the contents for the full 2-3 min. before consumption, there is a risk that the product will not be fully dissolved and that the patient will receive less than a full dose of the product, and that the product will therefore not be as effective as intended.

There is therefore a need for new formulations containing picosulfate, and, in particular, new liquid formulations, especially formulations wherein the picosulfate is combined with an osmotic laxative such as magnesium citrate.

SUMMARY

To overcome the disadvantages described above, it would be desirable to be able to supply formulations containing picosulfate in liquid form, ready for consumption by the patient. However, it has been found that formulations containing picosulfate, e.g., sodium picosulfate, are unstable when stored or allowed to stand. The present application provides liquid formulations containing picosulfate that have improved stability. In some embodiments, the liquid formulation can be stable for at least 10 days, such as for at least 60 days, or further such as for at least 1 year, at least 18 months, or at least 2 years, when stored at a temperature of about 20-25° C.

The present disclosure provides a liquid formulation comprising picosulfate and an antioxidant.

In some embodiments, the liquid formulation comprises picosulfate, an antioxidant, and an osmotic laxative such as a magnesium salt.

In some embodiments, the picosulfate is sodium picosulfate. In some embodiments, the picosulfate (e.g., sodium picosulfate) can be at a concentration in the range from about 0.10 mM to about 0.15 mM, e.g., about 0.12 mM to about 0.14 mM.

In some embodiments, the magnesium salt can be magnesium citrate. As an example, the magnesium citrate can be formed by the reaction of a magnesium base, e.g., magnesium hydroxide, magnesium oxide or magnesium carbonate, such as magnesium oxide, with citric acid, e.g., anhydrous citric acid or citric acid monohydrate, such as anhydrous citric acid. In some embodiments, the magnesium citrate can include salts in which the magnesium and citrate components are present in a molar ratio in the range from about 1:1 to about 1.5:1, e.g., from about 1.1:1 to about 1.5:1, about 1.2:1 to about 1.5:1, about 1.3:1 to about 1.5:1, about 1.4:1 to about 1.5:1, about 1:1 to about 1.4:1, about 1.2:1 to about 1.4:1, about 1.3:1 to about 1.4:1, about 1:1 to about 1.3:1, about 1.1:1 to about 1.3:1, about 1.2:1 to about 1.3:1, or about 1:1 to about 1.2:1. The magnesium and citric acid components can also be present in a molar ratio in the range from about 0.5:1 to about 1:1, about 0.6:1 to about 1:1, about 0.7:1 to about 1:1, about 0.8:1 to about 1:1, or about 0.9:1 to about 1:1.16. As a non-limiting example, the magnesium and citrate components can be present in a molar ratio of about 1.4:1.

In some embodiments, the antioxidant can be acetone sodium bisulfate, ascorbic acid or a salt or ester thereof (such as ascorbyl palmitate or sodium ascorbate), butylated hydroxyanisole, butylated hydroxytoluene, dodecyl gallate, erythorbic acid, histidine, D-mannose, monothioglycerol, octyl gallate, propionic acid, potassium metabisulfite, propyl gallate, sodium formaldehyde sulfoxylate, sodium metabisulfite, sodium sulfite, sodium thiosulfate, sulfur dioxide, thymol, α-tocopherol, or tocopheryl polyethylene glycol succinate.

In some embodiments, the antioxidant is a water-soluble antioxidant such as ascorbic acid, sodium ascorbate, sodium metabisulfite, potassium metabisulfite, sodium sulfite, sodium thiosulfate, sulfur dioxide, erythorbic acid or propionic acid.

In some embodiments, the antioxidant is chosen from sodium metabisulfite, potassium metabisulfite, mannose, histidine, butylated hydroxyanisole, butylated hydroxytoluene, propyl gallate, and α-tocopherol.

In some embodiments, the antioxidant is a water-insoluble antioxidant such as butylated hydroxyanisole, butylated hydroxytoluene, dodecyl gallate, octyl gallate, propyl gallate, thymol, α-tocopherol, or tocopheryl polyethylene glycol succinate.

In some embodiments, when the antioxidant is water-insoluble, the formulation can further comprise a solubilizing agent, such as a surfactant. The solubilizing agent can be, e.g., propylene glycol, polysorbate or poloxamer.

In some embodiments, the antioxidant can be present at a concentration in the range from about 0.002 M to about 0.1 M, e.g., about 0.005 M to about 0.02 M.

In some embodiments, the formulation can include a magnesium salt, such as magnesium citrate. In some embodiments, the formulation can include magnesium citrate formed from magnesium oxide and citric acid. In some embodiments, the formulation can include magnesium and citrate in a molar ratio in the range from about 1:1 to about 1.5:1, such as a molar ratio of about 1.4:1. In some embodiments, the formulation can include a magnesium salt (e.g., magnesium citrate) at a concentration of magnesium in the range from about 0.2 to about 0.8 M, e.g., in the range from about 0.5 to about 0.6 M.

In some embodiments, the formulation can include a carboxylic acid, such as acetic acid, arginine, ascorbic acid, asparagine, aspartic acid, cysteine, fumaric acid, formic acid, gluconic acid, glucuronic acid, glutamic acid, glutaric acid, glycolic acid, histidine, lactic acid, lysine, maleic acid, malic acid, malonic acid, methionine, oxalic acid, propionic acid, serine, succinic acid, tartaric acid, threonine, or tyrosine. For example, in some embodiments, the formulation can include a carboxylic acid such as malic acid, malonic acid, or gluconic acid. In some embodiments, the carboxylic acid is malic acid (e.g., D-malic acid, L-malic acid, or DL-malic acid). In some embodiments, the carboxylic acid is malonic acid. In some embodiments the carboxylic acid can be in the form of a salt, e.g., a sodium or potassium salt, such as a sodium salt. In some embodiments, the carboxylic acid can be present at a concentration in the range from about 0.01 M to about 5 M, e.g., from about 0.1 M to about 1 M.

In some embodiments, the formulation can include an ammonium salt, such as ammonium acetate, ammonium chloride, or ammonium sulfate. In some embodiments, the ammonium salt can be at a concentration in the range from about 1 g/L to about 40 g/L, e.g., from about 10 g/L to about 40 g/L.

In some embodiments, the formulation can include a soluble anionic polymer, such as a polysaccharide polymer, such as a polysaccharide polymer that includes carboxylic acid groups. Non-limiting examples of soluble anionic polymers include alginic acid, carboxymethylcellulose (CMC), carragenans, polyacrylic acid and copolymers thereof, and xanthan gum. In some embodiments the formulation can include particularly carboxymethylcellulose (CMC). In some embodiments, the formulation can include an anionic polymer at a concentration in the range from about 0.5 g/L to about 25 g/L, e.g., a concentration in the range from about 1 g/L to about 10 g/L.

In some embodiments, the formulation can include a preservative agent, such as methyl paraben, propyl paraben, sodium benzoate or potassium benzoate.

In some embodiments, the formulation can include a chelating agent, such as ethylenediaminetetraacetic acid (EDTA).

In some embodiments, the pH of the formulation can be in the range from about 4.5 to about 5.2, e.g., about 4.7 to about 4.9. The pH can be about 4.7. The pH can be about 4.8. The pH can be about 4.9.

In some embodiments, the formulation is stable for at least 1 year when stored at a temperature of about 20-25° C. In some embodiments, when stored for 1 year at a temperature of 20-25° C., the formulation forms less than about 1% of the compound Picosulfate Benzyl Alcohol and less than about 0.2% of the unspecified impurity Compound RRT 1.35 as measured by HPLC analysis area percentage compared to sodium picosulfate.

In some embodiments, when stored for 1 year at a temperature of 20-25° C., the formulation contains less than about 1% of the compound Picosulfate Related Compound A, less than about 1% of the compound Picosulfate Benzyl Alcohol, less than about 0.2% of the unspecified impurity Compound RRT 1.35, and less than about 0.2% of the unspecified impurity Compound RRT 1.94 as measured by HPLC analysis area percentage compared to sodium picosulfate.

In some embodiments, when stored for 1 year at a temperature of 20-25° C., the formulation forms less than about 1% of the compound Picosulfate Related Compound A, less than about 0.2% of the compound Picosulfate Benzyl Alcohol, less than about 0.2% of the unspecified impurity Compound RRT 1.35, and less than about 0.2% of the unspecified impurity Compound RRT 1.94 as measured by HPLC analysis area percentage compared to sodium picosulfate.

Although methods and materials similar or equivalent to those described herein can be used in the practice or testing of the present disclosure, suitable methods and materials are described below. All publications, patent applications, patents, and other references mentioned herein are incorporated by reference in their entirety. Where the first page number of a reference is given in a citation, it is to be understood that reference is being made to the entire article cited. In case of conflict, the present specification, including definitions, will control. In addition, the materials, methods, and examples are illustrative only and not intended to be limiting.

Other features and advantages of the present disclosure will be apparent from the following detailed description, and from the claims.

BRIEF DESCRIPTION OF THE FIGURE

FIG. 1 is a HPLC chromatogram of a sodium picosulfate-containing liquid formulation.

DETAILED DESCRIPTION

Definitions

Unless defined otherwise, all technical and scientific terms used herein have the same meaning as is commonly understood by one of ordinary skill in the art to which this disclosure belongs.

For the terms "e.g." and "such as," and grammatical equivalents thereof, the phrase "and without limitation" is understood to follow unless explicitly stated otherwise.

As used herein, the singular forms "a," "an," and "the" include plural referents unless the context clearly dictates otherwise.

As used herein, the term "about" means "approximately" (e.g., plus or minus approximately 10% of the indicated value).

The term "alkali metal" refers to a metal of group 1 (group IA) of the periodic table, including lithium, sodium, potassium and cesium.

The term "carboxylic acid" refers to an organic compound that contains one of more carboxylic acid groups (—C(=O)OH). The term includes carboxylic acids in neutral (protonated) form, as well as carboxylic acids in salt (anionic or deprotonated) form.

The term "identification threshold" refers to a limit above which a degradation product should be "identified." The term "identification" refers to the process of obtaining structural characterization of the degradation product.

The term "magnesium citrate" refers to a magnesium salt of citric acid. The magnesium citrate can be formed by the reaction of a magnesium base such as magnesium hydroxide, magnesium oxide or magnesium carbonate with citric acid, e.g., anhydrous citric acid or citric acid monohydrate.

The term "pH" refers to a numeric scale used to specify the acidity or basicity of an aqueous solution that is defined as being equal to the decimal logarithm of the reciprocal of the hydrogen ion activity in a solution. A practical pH scale is defined by the equation:

$$pH = \frac{(E - E_S)}{k}$$

in which E and $E_s$ are measured potentials of a galvanic cells containing a test solution and an appropriate buffer solution for standardization, and k is the change in potential per unit change in pH. Values that are obtained with solutions that are partially aqueous in character are considered apparent pH values.

The term "related impurity" in relation to impurities in a drug substance means an organic impurity sharing structural features with the drug substance formed, for example, during the synthesis of the drug substance ('synthetic impurities') and/or during storage ('degradants'), excluding impurities derived from catalysts, solvents and reagents. For example, the term "picosulfate related impurity" refers to an organic impurity sharing structural features with picosulfate.

The term "soluble" describes a compound that dissolves in solvent such as water or an aqueous solution. The term "insoluble" describes a compound that does not dissolve in a solvent such as water, or that has low solubility, such that obtaining useful dissolved concentrations are typically not obtained unless additional substances that increase the solubility of the compound (e.g., solubilizers, surfactants) are included in the composition.

The term "water soluble anionic polymer" refers to a polymer that, when dissolved in water or an aqueous solution, contains acidic functional groups and that is therefore anionic at neutral pH.

The term "stable" when used to refer to liquid formulations as described herein refers to lack of significant degradation of the active ingredients in the solution and/or the lack of visible precipitation over a given period of time (during which the formulation is considered to be "stable."). In general, stability can be evaluated or indicated by a number of methods, such as the amount of impurity and/or degradation products, the amount of visible precipitates, and/or the amount of the active ingredients that is chemically unchanged over the storage period. For example, the stability of formulation comprising picosulfate may be evaluated by, for example, whether a substantial proportion, e.g., at least 90% (such as at least about 95%, 96%, 97%, or 98%, and for example at least about 99%) of the picosulfate originally present in the solution (e.g., as determined by HPLC) remained in the formulation after the storage period. In addition, the stability of the tested formulation can be evaluated under different conditions, such as, at controlled temperature of 25° C.±2° C. (at about 60% relative humidity), 40° C.±2° C. (at about 75% relative humidity), 55° C. (dry heat), or ambient temperature and humidity.

The term "qualification threshold" refers to a limit above which a degradation product should be "qualified." The term "qualification" refers to the process of acquiring and evaluating data that establishes the biological safety of an individual degradation product or a given degradation profile at the levels specified.

The term "reporting threshold" refers to a limit above which a degradation product should be reported to regulatory authority.

The term "relative retention time (RRT)" describes the retention-time relationship between two peaks in a chromatogram. Usually one of the peaks is a known. The relative retention time is defined by the formula $RRT=t_2/t_1$ in which $t_1$ is the retention time of a standard and $t_2$ is the retention time of the unknown. For the chromatographic condition described herein, RRT of a compound may vary within about ±0.05. Unspecified compounds may be referred to or identified by their RRT. For example, as used herein, "Compound RRT 1.35" refers to an unspecified compound having RRT 1.35±0.05; and Compound RRT 1.94 refers to an unspecified compound having RRT 1.94±0.05.

At various places in the present specification, certain features are disclosed in groups or in ranges. It is specifically intended that such a disclosure include each and every individual sub-combination of the members of such groups and ranges. For example, the term "$C_1$-6 alkyl" is specifically intended to individually disclose (without limitation) methyl, ethyl, $C_3$ alkyl, $C_4$ alkyl, $C_5$ alkyl and $C_6$ alkyl.

Abbreviations

The following abbreviations and symbols may be used in the present disclosure: BHA (butylated hydroxyanisole); BHT (butylated hydroxytoluene); ° C. (degrees Celsius); CMC (carboxymethylcellulose); CRT (controlled room temperature); d (day(s)); EDTA (ethylenediaminetetraacetic acid); Ex (example); g (gram(s)); h (hour(s)); HCl (hydrochloric acid); HPMC (hydroxypropylmethylcellulose); HPLC (high-performance liquid chromatography); L (liter(s)); M (molar); mg (milligram(s)) mL (milliliter); mM (millimolar); PET (polyethylene terephthalate); ppt (precipitate/precipitation); NaOH (sodium hydroxide); Na-saccharin (sodium saccharin); Na-CMC (sodium carboxymethylcellulose); RH (relative humidity); RT (retention time); RRT (relative retention time); TDI (total daily intake); UPLC (ultra-performance liquid chromatography). Other common abbreviations may also be used herein.

Compositions

The present disclosure provides stable liquid formulations (compositions) comprising picosulfate and an antioxidant.

In some embodiments, the formulations are useful to treat constipation or for the clearance of the bowel prior to X-ray examination, endoscopy or surgery.

The present disclosure also provides stable liquid formulations comprising picosulfate, magnesium citrate, and an antioxidant. In some embodiments, the formulations are useful to treat constipation or for the clearance of the bowel prior to X-ray examination, endoscopy or surgery.

Picosulfate is typically supplied in the form of a solid formulation that is dissolved to provide a liquid formulation for immediate use. This can be disadvantageous due to the need for the patient to prepare the liquid formulation by dissolving the solid before it is consumed. It would be more convenient and advantageous for the patient if the picosulfate could be provided in a pre-prepared liquid formulation. This requires that the liquid formulation be stable during transportation and storage since a pre-prepared liquid formulation would not be consumed immediately following preparation.

A suitable pre-prepared picosulfate liquid formulation should have a shelf life of about 3 months or greater, such as about 6 months or greater, about 9 months or greater, about 12 months or greater, about 18 months or greater, or about 2 years or greater, when stored under ambient conditions, e.g., when stored in a closed container at ambient temperature (typically about 20° C., about 25° C., or in the range from about 20° C. to about 25° C.). In some embodiments, the storage can be under an inert gas, e.g., nitrogen or argon, and the liquid formulation optionally can be purged with an inert gas prior to storage, and/or can optionally be prepared with water or an aqueous solvent that has been purged with an inert gas prior to use for preparing the formulation.

A suitable pre-prepared picosulfate liquid formulation can be considered to have a shelf life of a particular period if, within the period defined for the shelf life, the formulation is stable. Stability of picosulfate formulation can be evaluated or indicated by, for example, the amount of degradation impurities arising from degradation of the picosulfate, the amount of visible precipitates formed, and/or the amount of picosulfate remained in the formulation after storage.

The amount of impurity that is considered significant can vary with the particular application. For example the International Conference on Harmonisation of Technical Requirements for Registration of Pharmaceuticals (ICH) provides guidelines setting thresholds for reporting and controlling degradation products, and it specifies that a degradant has to be reported, identified or qualified, respectively, if the amount of degradant in a formulation exceeds the applicable threshold, as summarized in Table 1.

TABLE 1

Thresholds for Degradation Products in New Drug Products

| Maximum Daily Dose | Reporting Threshold | Identification Threshold | Qualification Threshold |
|---|---|---|---|
| <1 mg | 0.1% | 1.0% or 5 µg TDI (whichever is lower) | 1.0% or 50 µg TDI (whichever is lower) |
| 1 mg-10 mg | | 0.5% or 20 µg TDI (whichever is lower) | |
| 10 mg-100 mg | | 0.2% or 2 mg TDI (whichever is lower) | 0.5% or 200 µg TDI (whichever is lower) |
| 100 mg-1 g | | | 0.2% or 3 mg (whichever is lower) |
| 1 g-2 g | 0.05% | | |
| >2 g | | 0.10% | 0.15% |

In some embodiments, formulation comprising picosulfate is considered stable when it contains degradants such as picosulfate related impurities at a level of about 1% or less when stored for about 12 months under ambient conditions, e.g., in a closed container at ambient temperature. In some embodiments, formulation comprising picosulfate is considered stable when it contains degradants such as picosulfate related impurities at a level of about 1.5% or less when stored for about 18 months or greater, or about 2 years or greater, when stored under ambient conditions, e.g., in a closed container at ambient temperature. The thresholds relate separately to each related impurity (including degradation products) and the percentage of the impurity is measured by HPLC analysis area percentage compared to sodium picosulfate.

In some embodiments, formulation comprising picosulfate is considered stable when it (1) contains degradants such as picosulfate related impurities at a level of about 1% or less, about 0.5% or less, about 0.2% or less, about 0.15% or less, or about 0.10% or less, and (2) contains no visible precipitates (solution is clear and transparent), when stored for about 3 months or greater, such as about 6 months or greater, about 9 months or greater, about 12 months or greater, about 18 months or greater, or about 2 years or greater, when stored under ambient conditions, e.g., in a closed container at ambient temperature. The thresholds relate separately to each related impurity (including degradation products) and the percentage of the impurity is measured by HPLC analysis area percentage compared to sodium picosulfate.

In some embodiments, formulation comprising picosulfate is considered to be stable, when stored under controlled room temperature condition (25° C.±2° C./60%±5% relative humidity), it contains degradants such as picosulfate related impurities at a level of about 1% or less, or about 0.5% or less, about 0.2% or less, about 0.15% or less, or about 0.10% or less when stored for about 3 months or greater, such as about 6 months or greater, about 9 months or greater, about 12 months or greater, about 18 months or greater, or about 2 years or greater, when stored under ambient conditions, e.g., in a closed container at ambient temperature. The thresholds relate separately to each related impurity (including degradation products) and the percentage of the impurity is measured by HPLC analysis area percentage compared to sodium picosulfate.

In some embodiments, formulation comprising picosulfate is considered to be stable, after storing at about 55° C. for two weeks, it comprises one or more of the following (the percentage of the impurity is measured by HPLC analysis area percentage compared to sodium picosulfate):

Picosulfate Benzyl Alcohol—less than about 1%, less than about 0.7%, or less than about 0.4%;

Picosulfate Related Compound A—less than about 1.5% or less than about 1.0%;

Unspecified (e.g., Compound RRT 1.35 or Compound RRT 1.94)—less than about 0.2%;

Total impurities—less than about 3.0%, less than 2.5%, less than about 2.0% or less than about 1.5%.

In some embodiments, formulation comprising picosulfate is considered to be stable, after storing at about 40° C./75% relative humidity for 3 months, it comprises one or more of the following (the percentage of the impurity is measured by HPLC analysis area percentage compared to sodium picosulfate):

Picosulfate Benzyl Alcohol—less than about 1.5%, less than about 1.0% or less than about 0.7%;

Picosulfate Related Compound A—less than about 1.5% or less than about 1.0%;
Unspecified (e.g., Compound RRT 1.35 or Compound RRT 1.94)—less than about 0.2%;
Total impurities—less than about 3.0%, less than about 2.5%, or less than about 2.0%.

In some embodiments, formulation comprising picosulfate is considered to be stable, after storing at about 40° C./75% relative humidity for 6 months, it comprises one or more of the following (the percentage of the impurity is measured by HPLC analysis area percentage compared to sodium picosulfate):
Picosulfate Benzyl Alcohol—less than about 2.5%, less than about 2.0% or less than about 1.5%;
Picosulfate Related Compound A—less than about 3.0%, less than about 2.0%, less than about 1.5%;
Unspecified—less than about 0.2%;
Total impurities—less than about 6.0%, less than about 5.0%, or less than about 4.0%.

In some embodiments, formulation comprising picosulfate is considered to be stable, after storing at about 25° C./60% relative humidity for 1 year, it comprises one or more of the following (the percentage of the impurity is measured by HPLC analysis area percentage compared to sodium picosulfate):
Picosulfate Benzyl Alcohol—less than about 1.5%, less than about 1.3% or less than about 1.0%;
Picosulfate Related Compound A—less than about 1.5% or less than about 1.0%;
Unspecified (e.g., Compound RRT 1.35 or Compound RRT 1.94)—less than about 0.2%;
Total impurities—less than about 3.0%, less than about 2.5%, or less than about 2.0%

In some embodiments, formulation comprising picosulfate is considered to be stable, after storing at about 25° C./60% relative humidity for 2 years, it comprises one or more of the following (the percentage of the impurity is measured by HPLC analysis area percentage compared to sodium picosulfate):
Picosulfate Benzyl Alcohol—less than about 3.0%, less than about 2.5% or less than about 2.0%;
Picosulfate Related Compound A—less than about 3.0%, less than about 2.5% or less than about 2.0%;
Unspecified (e.g., Compound RRT 1.35 or Compound RRT 1.94)—less than about 0.2%;
Total impurities—less than about 6.0%, less than about 5.0%, or less than about 4.0%.

The presence of picosulfate related impurities and unspecified impurities can be detected by a suitable analytical method that differentiates impurities from the picosulfate, e.g., HPLC. For simplicity in the analysis, the response factor of the impurity for structurally related unknown impurities can be assumed to be equal to the response factor of picosulfate so that the ratio of the signal (e.g., peak area in HPLC) for the impurity to that of picosulfate measures the relative amounts of the impurity and picosulfate. Details of an exemplary analytical method that is suitable for quantifying sodium picosulfate and identifying and quantifying related products is provided in the Examples below. The method uses ultra-high pressure chromatography (UPLC), on a Waters ACQUITY® UPLC HSS T3 2.1×100 mm chromatography column, which contains a $C_{18}$ reverse phase bonded silica (1.8 μm particle size), UV detection at 263 nm and a mobile phase gradient of 5-30% acetonitrile/95-70% aq. ammonium formate (25 mM; pH 3.45) at 0.2 mL/min. Under the analytical conditions used, sodium picosulfate has a retention time of about 7.4 min.

The inventors have found that liquid formulations comprising picosulfate (e.g., sodium picosulfate) are not stable upon storage and form degradation products. The inventors have surprisingly found that the formation of degradation products can be inhibited or reduced by including antioxidants in the formulation solution. Under the analytical conditions used, the impurities and degradation products can be characterized by the retention times and relative retention times shown in Table 2. The inventors have found that the degradation products formed when picosulfate-containing (e.g., sodium picosulfate-containing) liquid formulations are stored include previously unknown oxidation products.

TABLE 2

Impurities and Degradation Products Observed in Liquid Formulations Comprising Sodium Picosulfate

| Entry | | Retention Time | Relative Retention Time (±0.05) |
|---|---|---|---|
| 1 | Picosulfate Benzyl Alcohol | 6.2 min | 0.84 |
| 2 | Compound RRT 1.35 | 10.2 min. | 1.35 |
| 3 | Picosulfate Related Compound A | 13.1 min. | 1.77 |
| 4 | Compound RRT 1.94 | 14.4 min | 1.94 |
| 5 | Bisacodyl Related Compound A | 18.7 min. | 2.52 |

Picosulfate Related Compound A is identified as a picosulfate hydrolysis product of the structure (II):

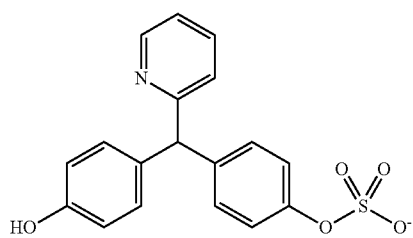

(4-4((4-hydroxyphenyl)(pyridin-2-yl)methyl)phenyl hydrogen sulfate).

Bisacodyl Related Compound A is identified as a picosulfate hydrolysis product of the structure (III):

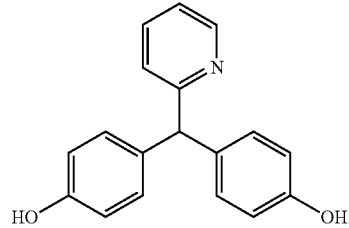

(4,4′-(pyridin-2-ylmethylene)diphenol).

Picosulfate Benzyl Alcohol is identified as a picosulfate oxidative product of the structure (IV):

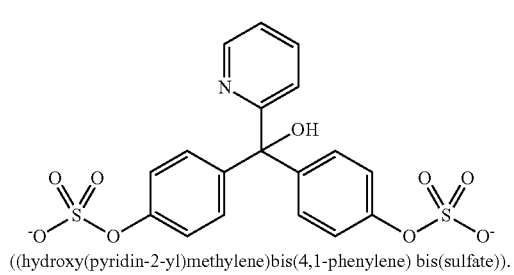

(IV)

((hydroxy(pyridin-2-yl)methylene)bis(4,1-phenylene) bis(sulfate)).

The structures of Compound RRT 1.35 and Compound RRT 1.94 have not been identified.

In some embodiments, the precipitates formed during the storage period may be resulted from the magnesium salt, e.g., magnesium citrate. Thus, in some embodiments, the amount of precipitates can be indirectly measured by assay of magnesium.

The present disclosure therefore provides a liquid formulation containing picosulfate and an antioxidant.

The picosulfate can be in the form of a salt and can be an alkali metal picosulfate, e.g., sodium picosulfate. In some embodiments, the picosulfate is sodium picosulfate. The picosulfate can be present in the composition at a concentration in the range from about 0.10 mM to about 0.15 mM, e.g., about 0.11 mM to about 0.15 mM, about 0.12 mM to about 0.15 mM, about 0.13 mM to about 0.15 mM, about 0.14 mM to about 0.15 mM, about 0.11 mM to about 0.14 mM, about 0.12 mM to about 0.14 mM, 0.13 mM to about 0.14 mM, about 0.11 mM to about 0.13 mM, about 0.12 mM to about 0.13 mM, or about 0.11 mM to about 0.13 mM. As non-limiting examples, the concentration of picosulfate can be in the range from about 0.12 mM to about 0.14 mM, or from about 0.13 mM to about 0.15 mM, such as about 0.13 mM or about 0.14 mM. The picosulfate salt can be present in an amount that provides a dose of sodium picosulfate, or a dose equivalent to a dose of sodium picosulfate, wherein the amount of sodium picosulfate in the dose is from about 5 mg to about 10 mg, such as from about 8 mg to about 12 mg, about 9 mg to about 11 mg, or about 10 mg, further such as 10 mg dose of sodium picosulfate. The dose can be included in a volume in the range from about 50 mL to about 250 mL, e.g., from about 100 mL to about 200 mL, from about 150 mL to about 170 mL; e.g., about 100 mL, about 120 mL, about 125 mL, about 140 mL, about 150 mL, about 160 mL, about 175 mL, about 180 mL, or about 200 mL.

Examples of suitable antioxidants that can be included in the formulation include acetone sodium bisulfite, ascorbic acid or a salt or ester thereof (such as ascorbyl palmitate or sodium ascorbate), butylated hydroxyanisole, butylated hydroxytoluene, histidine, D-mannose, potassium metabisulfite, propyl gallate, sodium metabisulfite, sodium sulfite, sodium thiosulfate, sulfur dioxide, α-tocopherol. Additional examples of antioxidants include dodecyl gallate, erythorbic acid, monothioglycerol, octyl gallate, propionic acid, sodium formaldehyde sulfoxylate, thymol, and tocopheryl polyethylene glycol succinate.

In some embodiments, the antioxidant can be a sulfur(II) compound or sulfur(IV) compound, such as sulfur dioxide or a sulfur oxyanion containing one or more sulfur atoms in a sulfur(II) or sulfur(IV) oxidation state, or both. Non-limiting examples include sulfite, bisulfite, disulfite, metabisulfate (dithionate), dithionite, thiosulfate (hyposulfite), or tetrathionate, Such salts can be included as, e.g., ammonium, or alkali metal (e.g., sodium, potassium) salts.

In some embodiments, the antioxidant can be a bisulfite, a sulfite, or a metabisulfite, e.g., ammonium bisulfite, ammonium sulfite, ammonium metabisulfite, sodium bisulfite, sodium sulfite, sodium metabisulfite, potassium bisulfite, potassium sulfite, or potassium metabisulfite. In some embodiments, the antioxidant can be sulfur dioxide. The antioxidants can be present in the formulation at a concentration in the range from about 0.002 M to about 0.1 M, e.g., concentrations from about 0.002 M to 0.05 M, e.g., from about 0.002 M to about 0.03 M, e.g., from about 0.002 M to about 0.02 M, from about 0.002 M to about 0.01 M, from about 0.005 M to about 0.05 M, from about 0.005 M to about 0.03 M, from about 0.005 M to about 0.02 M, from about 0.01 M to about 0.02 M. Suitable amounts of the antioxidant included in the formulations can include amounts in the range from about 0.5 g/L to about 5 g/L, e.g., from about 0.5 g/L to about 3 g/L, from about 0.5 g/L to about 2 g/L, from about 1 g/L to about 2 g/L.

In some embodiments, the antioxidant is a water-soluble antioxidant. Examples of suitable water-soluble antioxidants include ascorbic acid, sodium ascorbate, potassium ascorbate, sodium metabisulfite, potassium metabisulfite, sodium sulfite, sodium thiosulfate, and sulfur dioxide.

In some embodiments, the antioxidant is a water-insoluble antioxidant. Examples of suitable water-insoluble antioxidants include butylated hydroxyanisole, butylated hydroxytoluene, propyl gallate, thymol, and α-tocopherol.

In some embodiments, when the antioxidant is a water-insoluble antioxidant, the formulation can further include a solubilizing agent. The solubilizing agent can increase the solubility of the water-insoluble oxidizing agent in water or an aqueous solvent. In some embodiments, the solubilizing agent can be a surfactant. Examples of suitable solubilizing agent include propylene glycol, polysorbate, and poloxamer. Suitable amounts of the solubilizing agent included in the formulations can include amounts in the range from about 1 g/L to about 150 g/L, e.g., from about 1 g/L to about 100 g/L, from about 1 g/L to about 80 g/L, from about 1 g/L to about 50 g/L, from about 2 g/L to about 150 g/L, from about 2 g/L to about 100 g/L, from about 2 g/L to about 80 g/L, from about 2 g/L to about 50 g/L, from about 5 g/L to about 150 g/L, from about 5 g/L to about 100 g/L, from about 5 g/L to about 80 g/L, from about 5 g/L to about 50 g/L.

In some embodiments, the formulations can include an osmotic laxative such as a magnesium salt or magnesium oxide. In one embodiment, the magnesium salt can be magnesium citrate. As an example, the magnesium citrate can be formed by the reaction of a magnesium base, e.g., magnesium hydroxide, magnesium oxide or magnesium carbonate, such as magnesium oxide, with citric acid, e.g., anhydrous citric acid or citric acid monohydrate, such as anhydrous citric acid. The magnesium citrate can include salts in which the magnesium and citrate components are present in a molar ratio in the range from about 1:1 to about 1.5:1, e.g., from about 1.1:1 to about 1.5:1, about 1.2:1 to about 1.5:1, about 1.3:1 to about 1.5:1, about 1.4:1 to about 1.5:1, about 1:1 to about 1.4:1, about 1.2:1 to about 1.4:1, about 1.3:1 to about 1.4:1, about 1:1 to about 1.3:1, about 1.1:1 to about 1.3:1, about 1.2:1 to about 1.3:1, or about 1:1 to about 1.2:1. The magnesium and citric acid components can also be present in a molar ratio in the range from about 0.5:1 to about 1:1, about 0.6:1 to about 1:1, about 0.7:1 to about 1:1, about 0.8:1 to about 1:1, or about 0.9:1 to about 1:1.16. As a non-limiting example, the magnesium and citrate components can be present in a molar ratio of about 1.4:1.

In some embodiments, the magnesium salt, e.g., magnesium citrate, can be present in the formulation at a concentration that provides a concentration of magnesium in the range from about 0.1 M to about 1 M, e.g., from about 0.2 M to about 0.8 M, or from about 0.5 M to about 0.6 M, e.g., about 0.1 M, about 0.2 M, about 0.3 M, about 0.4 M, about 0.5 M, about 0.6 M, about 0.7 M, about 0.8 M, about 0.9 M, or about 1 M. As non-limiting examples, the magnesium salt is present at a concentration that provides a concentration of magnesium in the range from about 0.5 M to about 0.6 M, or at a concentration of about 0.6 M.

In some embodiments, the magnesium salt can be present in an amount per dose that is provided, or an amount that is equivalent to the amount that is provided, when the magnesium salt is prepared from magnesium oxide and the amount of magnesium oxide is in the range from about 1 g to about 6 g, e.g., from about 2 g to about 5 g, from about 2 g to about 4 g, from about 3 g to about 5 g, or from about 3 g to about 4 g, e.g., about 1 g, about 1.5 g, about 2 g, about 2.5 g, about 3 g, about 3.5 g, about 4 g, about 4.5 g, about 5 g, about 5.5 g, or about 6 g. For example, in one embodiment, the magnesium salt is present in an amount per dose that is provided, or an amount that is equivalent to the amount that is provided, when the magnesium salt is prepared from magnesium oxide and the amount of magnesium oxide is about 3.5 g.

In some embodiments, the magnesium salt can be present in an amount per dose that is provided by magnesium citrate when the magnesium citrate is prepared from magnesium oxide in the amounts specified above (or another magnesium base that provides magnesium in an equivalent amount to the amounts specified above) and citric acid. For example, the amount of citric acid per dose can be an amount of citric acid as specified by the molar ratios above. Further as an example, the amount of citric acid per dose can be an amount that is provided by an amount of anhydrous citric acid (or an equivalent amount of hydrated citric acid) in the range from about 3 g to about 20 g, e.g., from about 5 g to about 15 g, from about 10 g to about 15 g, or about 9 g, about 10 g, about 11 g, about 12 g, about 13 g, about 14 g, or about 15 g, such as about 12 g.

In some embodiments, the formulations can further include a carboxylic acid, an ammonium salt, and/or a soluble anionic polymer. While not being limited by any theory, it is considered that the carboxylic acid, and/or ammonium salt and/or soluble anionic polymer in an aqueous solution may help to increase the stability of formulation and/or inhibit, retard, or prevent the precipitation of salts, particularly magnesium salts, from the formulation. In some embodiments, one or more of a carboxylic acid, and/or ammonium salt and/or a soluble anionic polymer can be present in the formulation. As non-limiting examples, the formulation can include, e.g., a carboxylic acid and an ammonium salt (including an ammonium salt of a carboxylic acid), a carboxylic acid and a soluble anionic polymer, an ammonium salt and a soluble anionic polymer, or a carboxylic acid, an ammonium salt and a soluble anionic polymer. Further as non-limiting examples, the formulations can also include more than one of (e.g., two) of the carboxylic acid, the ammonium salt, and/or the soluble anionic polymer, including in combination with carboxylic acid(s), ammonium salt(s) and/or soluble anionic polymer(s). In some embodiments, when used in such combinations, the carboxylic acid(s), ammonium salt(s) and/or soluble anionic polymer(s) can be any one or any two or more of the carboxylic acids, ammonium salts and/or soluble anionic polymer described herein, and, when used in combination, they can be used in the amount specified for each component elsewhere in the present disclosure. When used in combination, the carboxylic acids, ammonium salts and/or soluble anionic polymer described herein may also be used in a smaller amount than when used individually, and may be used, e.g., in about 25%, 50% or 75% of the amount specified for each individual component elsewhere in the present disclosure.

In some embodiments, the carboxylic acids that can be used in the formulations are water soluble. For example, carboxylic acids can be chosen from mono-, di- and tricarboxylic acids. Further as an example, carboxylic acids can be chosen from $C_{1-6}$ (or $C_{1-4}$ or $C_{1-3}$) alkanoic acids, including formic, acetic and propionic acid. Also further as an example, carboxylic acids can be chosen from $C_{1-6}$ (or $C_{1-4}$ or $C_{1-3}$) alkandioic or alkenedioic acids, including oxalic acid, malonic acid, succinic acid, glutaric acid, adipic acid, fumaric acid, and maleic acid. Also as non-limiting example, carboxylic acids can be chosen from hydroxy-substituted acids, including mono-, di- or tri-hydroxy-substituted mono-, di- or tricarboxylic acids, including glycolic acid, malic acid, lactic acid, citric acid, tartaric acid, 3-hydroxypropionic acid, and glyceric acid. In one embodiment, carboxylic acids can be chosen from amino-substituted acids, including α- and β-amino acids, including glycine, arginine, histidine, lysine, aspartic acid, glutamic acid, serine, threonine, asparagine, glutamine, cysteine, methionine, proline, alanine, valine, isoleucine, leucine, phenylalanine, tyrosine, tryptophan, β-alanine, and homoserine. For acids containing one or more chiral centers, the configuration of each chiral center can be (R) or (S), and can be employed as a single isomer or mixture of isomers (e.g., a racemic mixture). For example, any of the α-amino acids arginine, histidine, lysine, aspartic acid, glutamic acid, serine, threonine, asparagine, glutamine, cysteine, methionine, proline, alanine, valine, isoleucine, leucine, phenylalanine, tyrosine, tryptophan or homoserine can be in D- or L-configuration (or as mixtures). The hydroxy-substituted carboxylic acids can also be employed in the form of stereoisomers or mixtures thereof, e.g., glycolic acid, malic acid, lactic acid, citric acid, tartaric acid, 3-hydroxypropionic acid, and glyceric acid.

Examples of suitable carboxylic acids include acetic acid, arginine, ascorbic acid, asparagine, aspartic acid, cysteine, fumaric acid, formic acid, gluconic acid, glucuronic acid, glutamic acid, glutaric acid, glycolic acid, histidine, lactic acid, lysine, maleic acid, malic acid, malonic acid, methionine, oxalic acid, propionic acid, serine, succinic acid, tartaric acid, threonine, and tyrosine. Preferred carboxylic acids are those that are approved by the Food and Drug Administration for use as inactive ingredients in pharmaceutical products. Also preferred are carboxylic acids that are approved or recognized as safe for use in food products.

In some embodiments, when the carboxylic acid is citric acid, the citric acid can be an excess over the citric acid used to form magnesium citrate. In some embodiments, the carboxylic acid can be a carboxylic acid other than citric acid. In some embodiments, the carboxylic acid can also be a carboxylic acid other than any of the other acids identified above, e.g., an acid other than malic acid. In some embodiments, the carboxylic acid can be a carboxylic acid other than any of the following acids: acetic acid, aspartic acid, citric acid, fumaric acid, glutamic acid, lactic acid, maleic acid, malic acid, and succinic acid.

In some embodiments, the carboxylic acid can be malic acid.

In some embodiments, the carboxylic acid can be malonic acid.

In some embodiments, the carboxylic acid can be tartaric acid. In some embodiments, the carboxylic acid can be D-tartaric acid. In some embodiments, the carboxylic acid can be L-tartaric acid. In some embodiments, the carboxylic acid can be DL-tartaric acid. In some embodiments, the carboxylic acid can be meso-tartaric acid.

In some embodiments, the carboxylic acid can be malonic acid or tartaric acid when the formulation does not comprise an ammonium salt or a soluble anionic polymer.

In some embodiments, the carboxylic acid can be gluconic acid (e.g., as sodium gluconate).

In some embodiments, the carboxylic acid can be succinic acid.

In some embodiments, the carboxylic acid can be included in the formulation in the form of a free acid, a salt, or a mixture of the acid one or more salts of the carboxylic acid, such as carboxylate salts. Examples of suitable salts include ammonium salts and alkali metal salts, e.g., sodium or potassium carboxylate salts. In one embodiment, the carboxylic acids are in the form of sodium salts and/or potassium salts. In one embodiment, ammonium salts are included. When the acid is an amino acid, the carboxylic acid can also be used in the form of an acid addition salt, e.g., a hydrochloride salt, hydrogen sulfate salt, or a sulfate salt.

In some embodiments, when the carboxylic acid is included in the formulation in the form of a salt, e.g., a carboxylate salt, a mineral acid can also be included in the formulation. The mineral acid can react with a carboxylate salt to form the free acid. Suitable mineral acids for this purpose include hydrochloric acid and sulfuric acid.

In some embodiments, the amount of carboxylic acid included in the formulation can be any amount that is effective to stabilize the formulation. Limits on the amount of carboxylic acid to be included in the formulation can include limits imposed by the solubility of the carboxylic acid, by the palatability of the carboxylic acid, or the toxicity or other undesirable properties of certain carboxylic acids. The carboxylic acids can be present in the formulation at a concentration in the range from about 0.01 M to 5 M, e.g., concentrations from about 0.01 g/L to about 5 M, e.g., from about 0.01 M to about 3 M, from about 0.01 M to about 1 M, from about 0.05 M to about 5 M, from about 0.05 M to about 3 M, from about 0.05 M to about 1 M, from about 0.1 M to about 5 M, from about 0.1 M to about 3 M, or from about 0.1 M to about 1 M, e.g., about 0.1 M, about 0.2 M, about 0.3 M, about 0.4 M, about 0.5 M, about 0.6 M, about 0.7 M, about 0.8 M, about 0.9 M, about 1.0 M, about 1.2 M, about 1.4 M, about 1.5 M, about 2 M, about 3 M, about 4 M, or about 5 M. Suitable amounts of the carboxylic acids included in the formulations can include amounts in the range from about 1 g/L to about 500 g/L, e.g., from about 1 g/L to about 300 g/L, from about 1 g/L to about 100 g/L, from about 5 g/L to about 500 g/L, from about 5 g/L to about 300 g/L, from about 5 g/L to about 100 g/L, from about 10 g/L to about 500 g/L, from about 10 g/L to about 300 g/L, or from about 10 g/L to about 100 g/L. For carboxylic acids that are liquids, suitable amounts of the carboxylic acids can include amounts in the range from about 1 mL/L to about 500 mL/L, e.g., from about 1 mL/L to about 300 mL/L, from about 1 mL/L to about 100 mL/L, from about 5 mL/L to about 500 mL/L, from about 5 mL/L to about 300 mL/L, from about 5 mL/L to about 100 mL/L, from about 10 mL/L to about 500 mL/L, from about 10 mL/L to about 300 mL/L, or from about 10 mL/L to about 100 mL/L.

In some embodiments, the soluble anionic polymer that can be used in the formulations include water soluble polymers containing carboxylic acid, sulfonic acid and sulfate groups. In one embodiment, water soluble polymers containing carboxylic acid groups are included. In some embodiments, the soluble anionic polymer is a polysaccharide polymer. Examples of suitable anionic polymers include alginic acid, carboxymethylcellulose, carragenans, polyacrylic acid and copolymers thereof, and xanthan gum. The soluble anionic polymer can be included in the formulation in the form an acid, a salt form, in which the acidic functional groups have been deprotonated to anionic (or salt) form, or as a form in which the acidic functional groups have been partially deprotonated. The soluble anionic polymers can be, e.g., sodium alginate or sodium carboxymethylcellulose. As an example, the polymer is included in anionic form. Suitable counter ions for the soluble anionic polymer include alkali metal counter ions, e.g., sodium or potassium, or ammonium counter ions. Further as an example, the sodium salt forms of the soluble anionic polymer are chosen from the potassium salt forms.

In some embodiments, the amount of the soluble anionic polymer included in the formulation can be any amount that is effective to stabilize the formulation. Limits on the amount of the soluble anionic polymer to be included in the formulation can include limits imposed by the solubility of the soluble anionic polymer, by the palatability of the soluble anionic polymer, or the toxicity or other undesirable properties of certain soluble anionic polymer. The presence of a soluble anionic polymer can also increase the viscosity of the liquid formulation, which can also impose limits on the amount of soluble anionic polymer included in the formulation. In some embodiments, the liquid formulation should be relatively free flowing so that it can be easily consumed orally by a patient.

In some embodiments, the soluble anionic polymer can be alginic acid, e.g., as sodium alginate. Examples include PROTANAL® CR 8133, PROTANAL® 8233, PROTANAL® LFR 5/60 or PROTACID® 120 NM.

In some embodiments, the soluble anionic polymer can be carboxymethylcellulose, e.g., as sodium carboxymethylcellulose. Examples include AQUALON® CMC-7L2P, or AQUALON® CMC-7LF.

In some embodiments, the soluble anionic polymer can be carrageenan, e.g., lambda-carrageenan. Examples include VISCARIN® GP 109F.

In some embodiments, the soluble anionic polymer can be poly(acrylic) acid.

In some embodiments, the soluble anionic polymer can be xanthan gum. Examples include XANTURAL® 75.

In some embodiments, suitable amounts of the soluble anionic polymer included in the formulations can include amounts in the range from about 0.5 g/L to about 25 g/L, e.g., from about 0.5 g/L to about 20 g/L, from about 0.5 g/L to about 10 g/L, from about 0.5 g/L to about 5 g/L, from about 1 g/L to about 25 g/L, from about 1 g/L to about 20 g/L, from about 1 g/L to about 10 g/L, from about 1 g/L to about 5 g/L, from about 2 g/L to about 25 g/L, from about 2 g/L to about 20 g/L, from about 2 g/L to about 10 g/L, from about 2 g/L to about 5 g/L, from about 5 g/L to about 25 g/L, from about 5 g/L to about 20 g/L, from about 5 g/L to about 10 g/L, from about 10 g/L to about 25 g/L, from about 10 g/L to about 20 g/L, from about 10 g/L to about 15 g/L, or from about 15 g/L to about 20 g/L.

In some embodiments, the formulations can include both a carboxylic acid and a soluble anionic polymer.

In some embodiments, the formulations can include both malic acid and alginic acid, e.g., as sodium alginate. In some embodiments, the formulations can include both malic acid and carboxymethylcellulose, e.g., as sodium carboxymethylcellulose. In some embodiments, the formulations can include both malic acid and carrageenan, e.g., lambda-carrageenan. In some embodiments, the formulations can include both malic acid and poly(acrylic) acid. In some embodiments, the formulations can include both malic acid and xanthan gum. The malic acid can be, e.g., D-, L- or DL-malic acid.

In some embodiments, the formulations can include both malonic acid and alginic acid, e.g., as sodium alginate. In some embodiments, the formulations can include both malonic acid and carboxymethylcellulose, e.g., as sodium carboxymethylcellulose. In some embodiments, the formulations can include both malonic acid and carrageenan, e.g., lambda-carrageenan. In some embodiments, the formulations can include both malonic acid and poly(acrylic) acid. In some embodiments, the formulations can include both malonic acid and xanthan gum.

In some embodiments, the formulations can include both tartaric acid and alginic acid, e.g., as sodium alginate. In some embodiments, the formulations can include both tartaric acid and carboxymethylcellulose, e.g., as sodium carboxymethylcellulose. In some embodiments, the formulations can include both tartaric acid and carrageenan, e.g., lambda-carrageenan. In some embodiments, the formulations can include both tartaric acid and poly(acrylic) acid. In some embodiments, the formulations can include both tartaric acid and xanthan gum. The tartaric acid can be, e.g., D-, L-, DL- or meso-tartaric acid.

In some embodiments, the formulations can include both gluconic acid, e.g., as sodium gluconate, and alginic acid, e.g., as sodium alginate. In some embodiments, the formulations can include both gluconic acid, e.g., as sodium gluconate, and carboxymethylcellulose, e.g., as sodium carboxymethylcellulose. In some embodiments, the formulations can include both gluconic acid, e.g., as sodium gluconate, and carrageenan, e.g., lambda-carrageenan. In some embodiments, the formulations can include both gluconic acid, e.g., as sodium gluconate, and poly(acrylic) acid. In some embodiments, the formulations can include both gluconic acid, e.g., as sodium gluconate, and xanthan gum.

In some embodiments, the formulations can include both succinic acid and alginic acid, e.g., as sodium alginate. In some embodiments, the formulations can include both succinic acid and carboxymethylcellulose, e.g., as sodium carboxymethylcellulose. In some embodiments, the formulations can include both succinic acid and carrageenan, e.g., lambda-carrageenan. In some embodiments, the formulations can include both succinic acid and poly(acrylic) acid. In some embodiments, the formulations can include both succinic acid and xanthan gum.

In some embodiments, the ammonium salts that can be used in the formulations include water soluble salts of mineral acids or carboxylic acids. The ammonium salts that can be used in the formulation include ammonium chloride, ammonium hydrogen sulfate, or ammonium sulfate. The ammonium salts that can be used in the formulation also include ammonium carboxylate salts with any of the carboxylic acids identified above, e.g., ammonium formate, ammonium acetate, and ammonium propionate. The ammonium salts that can be used in the formulation can be formed in situ by the reaction of ammonia with a suitable acid.

In some embodiments, the amount of ammonium salt included in the formulation can be any amount that is effective to stabilize the formulation. Limits on the amount of ammonium salt to be included in the formulation can include limits imposed by the solubility of the ammonium salt, by the palatability of the ammonium salt, or the toxicity or other undesirable properties of certain ammonium salts.

In some embodiments, the ammonium salts included in the formulations can include amounts in the range from about 1 g/L to about 40 g/L, e.g., from about 1 g/L to about 20 g/L, from about 1 g/L to about 10 g/L, from about 1 g/L to about 5 g/L, from about 5 g/L to about 40 g/L, from about 5 g/L to about 20 g/L, from about 10 g/L to about 40 g/L, or from about 10 g/L to about 20 g/L.

In some embodiments, the formulations can also include a preservative agent such as methyl paraben, propyl paraben, sodium benzoate or potassium benzoate. Suitable amounts of the preservative included in the formulations can include amounts in the range from about 0.1 g/L to about 2 g/L, e.g., from about 0.1 g/L to about 1.5 g/L, from about 0.1 g/L to about 1 g/L, from about 0.5 g/L to about 2 g/L, or from about 0.5 g/L to about 1 g/L.

In some embodiments, the formulations can also include a chelating agent such as ethylenediaminetetraacetic acid (EDTA) (which can be in the form of a salt). Suitable amounts of the chelating agent included in the formulations can include amounts in the range from about 0.1 g/L to about 5 g/L, e.g., from about 0.1 g/L to about 3 g/L, from about 0.1 g/L to about 2 g/L, from about 0.5 g/L to about 5 g/L, from about 0.5 g/L to about 3 g/L, from about 0.5 g/L to about 2 g/L, or from about 1 g/L to about 2 g/L.

In some embodiments, the pH of the solution can be in the range from about 4.0 to about 6.5, such as from about 4.0 to about 5.5. In some embodiments, a low pH (below about 6.5, or below about 5.5) may be beneficial to help to stabilize the formulation and inhibit, retard, or prevent the precipitation of salts (e.g., magnesium salts) from the formulation; however, it is also understood that picosulfate can be unstable at a pH lower than about 4.0, and thus the pH of the formulation be in the range from about 4.0 to about 6.5, or, as an example, from about 4.0 to about 5.5. The pH can be in a range, e.g., from about 4.0 to about 5.2, from about 4.0 to about 5.0, from about 4.0 to about 4.8, from about 4.0 to about 4.6, from about 4.0 to about 4.5, from about 4.0 to about 4.4, from about 4.0 to about 4.2, from about 4.2 to about 5.5, from about 4.2 to about 5.2, from about 4.2 to about 5.0, from about 4.2 to about 4.8, from about 4.2 to about 4.6, from about 4.2 to about 4.5, from about 4.2 to about 4.4, from about 4.4 to about 5.5, from about 4.4 to about 5.2, from about 4.4 to about 5.0, from about 4.4 to about 4.8, from about 4.4 to about 4.6, from about 4.5 to about 5.5, from about 4.5 to about 5.2, from about 4.5 to about 5.0, from about 4.5 to about 4.8, from about 4.6 to about 5.5, from about 4.6 to about 5.2, from about 4.6 to about 5.0, from about 4.6 to about 4.8, from about 4.8 to about 5.5, from about 4.8 to about 5.2, or from about 4.8 to about 5.0. In one embodiment, the pH is in the range from about 4.5 to about 5.2. In one embodiment, the pH can be, e.g., about 4.0, about 4.1, about 4.2, about 4.2, about 4.3, about 4.4, about 4.5, about 4.6, about 4.7, about 4.8, about 4.9, about 5.0, about 5.1, about 5.2, about 5.3, about 5.4, or about 5.5. In one embodiment, the pH is about 4.9.

In some embodiments, to obtain the formulation to the required pH, one or more acids or bases can be included in the formulation to adjust the pH. To lower the pH, one or more acids can be used, e.g., hydrochloric acid, sulfuric acid, a carboxylic acid (which can be one or more of the carboxylic acids described in greater detail above) or an ammonium salt (which can be one or more of the ammonium salts described in greater detail above). To increase the pH, one or more bases can be used, e.g., sodium hydroxide, potassium hydroxide, sodium bicarbonate, potassium bicarbonate, sodium carbonate, potassium carbonate, or sodium or potassium salts of carboxylic acids (which can be one or more of the carboxylic acids described in greater detail above). Upon reaction with other acidic or basic components of the formulation, such acids and bases can form salts that can be present as additional components of the formulation, e.g., sodium chloride, sodium sulfate, potassium sulfate, and potassium chloride.

In some embodiments, the formulations are aqueous formulations containing water a solvent. Additional water-soluble or water-miscible solvents can also be present in the formulation, including, e.g., alcohols, including $C_{2-4}$ alcohols such as ethanol, or glycols such as propylene glycol or polyethylene glycol.

In some embodiments, additional ingredients that may be present in the formulation include sweetening and flavoring agents. Examples of sweetening agent is aspartame and saccharin sodium. Examples of flavoring agents include orange flavor containing acacia gum, lactose, ascorbic acid and butylated hydroxyanisole, and cranberry flavor containing maltodextrin, glyceryl triacetate (triacetin) and sodium octenyl succinated starch.

It will be appreciated that the sodium picosulfate, magnesium salts, carboxylic acids, ammonium salts and soluble anionic polymers, and other formulation components defined above are independent components of the composition and therefore any of the identified magnesium salts, carboxylic acids, ammonium salts and soluble anionic polymers, and other formulation components can be included in the formulation. Further, each of that the sodium picosulfate, magnesium salts, carboxylic acids, ammonium salts and soluble anionic polymers, and other formulation components can be included in the amounts described above.

Manufacture of the Formulation

The liquid formulation described herein can be prepared by dissolving the ingredients of the formulation in a suitable liquid, such as water, to provide any of the liquid formulations as described above.

In some embodiments, when the formulation contains magnesium citrate, magnesium oxide and citric acid are used to provide the magnesium citrate. The ingredients are used in amounts such that, the appropriate concentrations (such as those described above) are provided when the ingredients are dissolved in a given volume (e.g., as a non-limiting example, 150 mL may be used to provide a single unit dose) of the liquid.

The present disclosure thus provides a method of preparing a liquid formulation comprising dissolving ingredients comprising picosulfate, magnesium oxide, citric acid and an antioxidant to form a liquid formulation.

In some embodiments, the ingredients further comprise a carboxylic acid, an ammonium salt or a soluble anionic polymer.

Also provided is a pharmaceutical composition that includes sodium picosulfate, magnesium oxide, citric acid and an antioxidant. The pharmaceutical composition can, for example, be a mixture of dry ingredients that forms a liquid formulation as described herein when it is dissolved.

Also provided is a liquid pharmaceutical composition prepared by, or obtainable by, the methods described herein.

The ingredients can be added to the formulation and/or dissolved in any suitable combination or order. For example, the ingredients (or a sub-set of the ingredients) can be mixed as a dry formulation, before dissolving, or any of the ingredients can be added sequentially. If required, heating can be used to dissolve some of the ingredients. In some embodiments, heating is not applied to a solution comprising sodium picosulfate. Suitable and non-limiting methods of preparing the formulations are described in the Examples.

In some embodiments, if necessary, the pH of the formulation can be adjusted to the range from about 4.0 to about 6.5, e.g., from about 4.0 to about 5.5, about 4.5 to about 5.2, from about 4.7 to about 4.9, or about 4.8. The pH can be adjusted using a suitable acid and/or base (e.g., hydrochloric acid and/or sodium hydroxide). In a non-limiting example, the pH can be adjusted after all the ingredients have been dissolved or, e.g., following the addition of magnesium oxide, citric acid, and antioxidant, but prior to addition of sodium picosulfate.

Following preparation, the liquid formulation can be packaged in a suitable container (e.g., a bottle), which can include one or two doses of the formulation, and can be sealed with a closure. A dose can be included in a volume of the liquid formulation in the range from about 50 mL to about 250 mL, e.g., from about 100 mL to about 200 mL, for example about 100 mL, about 120 mL, about 125 mL, about 140 mL, about 150 mL, about 160 mL, about 175 mL, about 180 mL, or about 200 mL, preferably about 160 mL.

In some embodiments, following preparation, the formulation can be stored at a temperature in the range from about 0° C. to about 30° C., e.g., about 4° C., about 5° C., about 10° C., about 15° C., about 20° C., about 21° C., about 22° C., about 23° C., about 24° C., or about 25° C.

In some embodiments, the formulation is stable upon storage for at least about thirty days, about sixty days, about 90 days, at least about six months, at least about a year, at least about 18 months, or at least about two years.

Use and Administration of the Formulation

The liquid formulation described herein can be used to treat constipation or for the clearance of the bowel prior to X-ray examination, endoscopy or surgery.

In some embodiments, the liquid formulation containing effective amounts of picosulfate (e.g., sodium picosulfate) and magnesium (e.g., magnesium citrate) is administered to a subject (e.g., a patient) in need of the treatment.

In some embodiments, the picosulfate salt can be present in an amount that provides a dose of sodium picosulfate, or a dose equivalent to a dose of sodium picosulfate, wherein the amount of sodium picosulfate in the dose is from about 5 mg to about 15 mg, such as from about 8 mg to about 12 mg, about 9 mg to about 11 mg, or about 10 mg, further such as a 10 mg dose of sodium picosulfate. The magnesium salt can be present in an amount per dose that is provided, or an amount that is equivalent to the amount that is provided, when the magnesium salt is prepared from magnesium oxide and the amount of magnesium oxide is in the range from about 1 g to about 6 g, e.g., from about 2 g to about 5 g, from about 2 g to about 4 g, from about 3 g to about 5 g, or from about 3 g to about 4 g, e.g., about 1 g, about 1.5 g, about 2 g, about 2.5 g, about 3 g, about 3.5 g, about 4 g, about 4.5 g, about 5 g, about 5.5 g, or about 6 g, such as about 3.5 g. The magnesium salt can be present as the citrate salt wherein the amount of citric acid per dose can be an amount that is provided by an amount of anhydrous citric acid (or an equivalent amount of hydrated citric acid) in the range from about 3 g to about 20 g, e.g., from about 5 g to about 15 g, from about 10 g to about 15 g, or about 9 g, about 10 g, about 11 g, about 12 g, about 13 g, about 14 g, or about 15 g, such as about 12 g. The dose can be included in a volume of the liquid formulation in the range from about 50 mL to about 250 mL, e.g., from about 100 mL to about 200 mL, for example about 100 mL, about 120 mL, about 125 mL, about 140 mL, about 150 mL, about 160 mL, about 175 mL, about 180 mL, or about 200 mL, such as about 160 mL.

In some embodiments, the liquid formulation can further comprise an antioxidant. As a non-limiting example, the antioxidant can be sodium metabisulfite or potassium metabisulfite. In some embodiments, the liquid formulation can further comprise a carboxylic acid, such as malic acid or malonic acid.

In some embodiments, when used for clearance of the bowel, e.g., prior to X-ray examination, endoscopy or surgery, it can be useful for two doses of the liquid formulation to be administered. For example, the following procedures may be used:

The formulation can be given a split dose administration where a first dose of the formulation is taken the evening before the procedure (e.g., between about 5 μm and about 9 pm), which can be followed administration of clear liquid (e.g., five 150 mL glasses of clear liquid). Then, a second dose of the formulation can be taken the morning of the procedure (e.g., at least 1, 2, 3, 4, 5, 6, 7 or 8 hours prior to, but typically no more than 8, 9 or 10 hours prior to, the procedure), which can be followed by administration of clear liquid (e.g., three 150 mL glasses of clear liquid).

The formulation can also be given a split dose administration where two doses of the formulation are taken the day before the procedure. For example, one dose of the liquid formulation can be taken in the afternoon (e.g., between about 4 μm and about 6 pm), which can be followed administration of clear liquid (e.g., five 150 mL glasses of clear liquid). Then, a second dose of the formulation can be taken in the late evening (e.g., approximately 6 h later, e.g., between about 10 μm and about 12 am), which can be followed by administration of clear liquid (e.g., three 150 mL glasses of clear liquid).

EXAMPLES

The invention is further described in the following examples, which do not limit the scope of the invention described in the claims.

Quantitative Analytical Method for Sodium Picosulfate

Sodium picosulfate is quantitatively identified and analyzed using a reversed-phase UPLC method and UV detection.

Equipment used is as follows:

Waters I-Class UPLC system with PDA detector or equivalent

HPLC column: Waters Acuity UPLC HSS T3, 2.1×100 mm, 1.8 μm, part #186003539

For the first mobile phase (mobile phase A), 25 mM ammonium formate buffer, pH 3.45 is used. For the second mobile phase (mobile phase B), acetonitrile HPLC grade is used. MILI-Q® water or equivalent used for dilution of all standards and samples.

For the HPLC analysis, instrument parameters are set as indicated in Table 3 and a mobile phase gradient is run for each injection as indicated in Table 4.

TABLE 3

Instrument Parameters for HPLC Analysis

| Parameter | Value |
|---|---|
| Sample temperature | Ambient |
| Column Temperature | 45° C. |
| Flow rate | 0.2 mL/min. |
| Detection wavelength | 263 nm |
| Injection volume | 6 μL |
| Total run time | 25 minutes |

TABLE 4

Mobile Phase Gradient for HPLC Analysis

| Time (minutes) | Flow rate (mL/min) | Mobile Phase A (%) | Mobile Phase B (%) |
|---|---|---|---|
| 0 | 0.2 | 95 | 5 |
| 15.0 | 0.2 | 85 | 15 |
| 20.0 | 0.2 | 70 | 30 |
| 20.1 | 0.2 | 95 | 5 |
| 25.0 | 0.2 | 95 | 5 |

All samples and standards prepared at concentration of 0.031 mg/mL. A standard solution of sodium picosulfate is prepared by accurately weighing 15.5 mg of sodium picosulfate reference standard and diluting in 500 mL of water.

Samples are prepared by transferring 5 mL of the bulk or drug product solution to a 10 mL volumetric flask and diluting to volume with water and filtered with a 0.45 μm PVDF filter.

System suitability is demonstrated for the method according to the acceptance criteria shown in Table 5.

TABLE 5

System Suitability Acceptance Criteria for HPLC Analysis

| Parameter | Acceptance Criteria |
|---|---|
| Peak Area Reproducibility | The % RSD of the peak area response from the first five Working Standard 1 injections must be ≤2.0% |
| Efficiency | USP plate count (N) in the first Working Standard Solution 1 injection must be ≥8000 |
| Tailing | Tailing (tf) of sodium picosulfate in the first Working Standard Solution 1 injection is ≤2.0 |
| System Suitability Throughout | The overall % RSD of the area of Working Standard 1 throughout the sequence is ≤2.0% |
| Signal to Noise ratio (S/N) | The signal to noise ration of the Sensitivity solution must be ≥10 or sodium picosulfate area % RSD in Sensitivity solution must be ≤15.0% (n = 3) |
| Standard Agreement Comparison | The standard agreement of the last two injections of Working Standard Solution 1 and the first 2 injections of the Working Standard Solution 2 (check standard) is between 98.0 and 102.0%. |

The sodium picosulfate peak in the samples is identified by comparing the retention time of the sodium picosulfate peak to the sodium picosulfate peak in the working standard (approximately 7.4 min.)

The relative retention time and relative response factor for related substances is shown in Table 6.

TABLE 6

Relative Retention Time Determination and Relative Response Factor for Related Substances

| Related Substance Name | Approximate Relative Retention Time (RRT) | Relative response factor (RRF) |
|---|---|---|
| Picosulfate Related Compound A | 1.77 | 1.2 |
| Bisacodyl Related Compound A | 2.52 | 0.9 |
| Picosulfate Benzyl Alcohol | 0.84 | 1.0 |
| Compound RRT 1.35 | 1.38 | 1.0 |
| Compound RRT 1.94 | 1.94 | 1.0 |

The assay content of sodium picosulfate is calculated using the following equation:

$$\% \text{ Label} = \frac{Ru}{Rs} \times \frac{Cs}{LC} \times D \times 160 \times 100\%$$

in which:
Ru=Peak area response of sodium picosulfate in sample solution
Rs=Ave peak area response of sodium picosulfate in all Working Standard Solution 1 injections
Cs=Concentration of Working Standard Solution, corrected for purity (mg/mL)
LC=Label Claim of sodium picosulfate (10 mg)
D=Sample dilution (10 mL/5 mL)
160=volume of unit dose, mL The amount of each degradation product is calculated using following equation:

$$\% \text{ Degradation\_product} = \frac{Ru}{Rs} \times \frac{Cs}{LC} \times RRF \times D \times 160 \times 100\%$$

in which:
Ru=Peak area response of sodium picosulfate degradation product in sample solution
Rs=Ave peak area response of sodium picosulfate in all Working Standard Solution 1 injections
Cs=Concentration of Working Standard Solution, corrected for purity (mg/mL)
LC=Label Claim of sodium picosulfate (10 mg)
RRF=Relative Response Factor (Table 6, or 1.0)
D=Sample dilution (10 mL/5 mL)
160=volume of unit dose, mL To calculate the amount of degradation products, peaks in the sample solution with an area count greater or equal to sodium picosulfate peak area in the Sensitivity Solution is integrated. Peaks associated with blank diluent or the placebo are not integrated or reported.

A typical chromatogram from the analysis is shown in FIG. 1.

Reference Examples A-C: Effect of pH on the Stability of Solutions Containing Sodium Picosulfate, Magnesium Citrate, Sodium Carboxymethylcellulose and Sodium Gluconate Liquid formulations containing sodium picosulfate and magnesium citrate were prepared as follows:
1. Sodium carboxymethylcellulose (AQUALON® 7L2P), EDTA, methylparaben and propylparaben are dissolved in water with heating and the solution was then allowed to cool to ambient temperature.
2. Sodium gluconate was added and the pH of the solution was adjusted to below 2.5 with HCl (12 M).
3. Citric acid and magnesium oxide were added and dissolved by mixing.
4. Na-saccharin and flavor were added and dissolved.
5. The solutions are weighed, and any water lost was replaced.
6. The pH was adjusted to 4.5, 4.8 or 5.2 with HCl (12 M) and/or NaOH.
7. Sodium picosulfate was added.

The compositions of the formulations are shown in Table 7.

TABLE 7

Sodium Picosulfate/Magnesium Citrate Formulations

| Formulation | A | B | C |
|---|---|---|---|
| Water (g) | 72.22 | 72.22 | 72.22 |
| Na-CMC (AQUALON ® 7L2P) (g) | 0.361 | 0.361 | 0.361 |
| Sodium Gluconate (g) | 5.12 | 5.12 | 5.12 |
| Citric acid (g) | 5.78 | 5.78 | 5.78 |
| Magnesium oxide (g) | 1.69 | 1.69 | 1.69 |
| Na-saccharin (g) | 0.06 | 0.06 | 0.06 |
| Methylparaben (g) | 0.07 | 0.07 | 0.07 |
| Propylparaben (g) | 0.014 | 0.014 | 0.014 |
| Berry Flavor (g) | 0.06 | 0.06 | 0.06 |
| EDTA (g) | 0.025 | 0.025 | 0.025 |
| HCl (12M) (mL) | 2.69 | 3.06 | 4.22 |
| NaOH (g) | 1.19 | 1.68 | 2.33 |
| Sodium picosulfate (g) | 0.0047 | 0.0047 | 0.0047 |
| pH | 4.5 | 4.8 | 5.2 |

The samples were stored in a closed container at 40° C. and 75% relative humidity for 3-6 months and analyzed using the UPLC method described above. The results of the analysis are summarized in Table 8.

TABLE 8

Stability and Decomposition of Sodium Picosulfate/Magnesium Citrate Formulations

| | | | Degradation Products | | |
|---|---|---|---|---|---|
| No. | Storage Conditions | Formulation | Picosulfate Benzyl Alcohol (RRT 0.84) (Area %) | Compound RRT 1.35 (Area %) | Picosulfate Related Compound A (Area %) |
| 1 | 40° C., 75% RH, | A (pH 4.5) | 0.76 | 0.10 | 1.68 |
| 2 | 3 months | B (pH 4.8) | 1.98 | 0.19 | 0.76 |
| 3 | | C (pH 5.2) | 4.01 | 0.39 | 0.29 |
| 4 | 40° C., 75% RH, | A (pH 4.5) | 1.40 | 0.16 | 3.23 |
| 5 | 6 months | B (pH 4.8) | 3.00 | 0.36 | 1.51 |
| 6 | | C (pH 5.2) | 5.70 | 0.89 | 0.57 |

The results show that formation of the degradation products Picosulfate Benzyl Alcohol and Compound RRT 1.35 increased with increasing pH, but formation of the degradation product Picosulfate Related Compound A decreased with increasing pH.

Reference Examples D-G. Stability of Sodium Picosulfate/Magnesium Citrate Containing Solutions Containing Sodium Carboxymethylcellulose/Sodium Gluconate or Malic Acid Formulations containing sodium picosulfate, magnesium citrate and sodium carboxymethylcellulose/sodium gluconate or malic acid were prepared having the compositions shown in Table 9.

TABLE 9

Sodium Picosulfate/Magnesium Citrate Formulations Containing Sodium Carboxymethylcellulose/Sodium Gluconate (D and E) or Malic Acid (F and G)

| Formulation | D | E | F | G |
|---|---|---|---|---|
| Water (g) | 140.22 | 140.11 | 145.50 | 145.50 |
| Na-CMC (AQUALON® 7L2P) (g) | 0.75 | 0.75 | — | — |
| Sodium Gluconate (g) | 10.64 | 10.64 | — | — |
| Malic Acid, d, l- (g) | — | — | 8.38 | 8.38 |
| Citric acid, anhydrous (g) | 12.0 | 12.0 | 12.0 | 12.0 |
| Magnesium oxide (g) | 3.5 | 3.5 | 3.5 | 3.5 |
| Na-saccharin (g) | 0.4 | 0.4 | — | — |
| Acesulfame K (g) | — | — | 0.2 | 0.2 |
| Sucralose (g) | — | — | 0.2 | 0.2 |
| Sodium benzoate (g) | 0.09 | 0.09 | 0.09 | 0.09 |
| Berry Flavor (g) | 0.12 | — | 0.12 | — |
| Orange Flavor (g) | — | 0.12 | — | 0.12 |
| Edetate Disodium (g) | 0.07 | 0.07 | 0.07 | 0.07 |
| Hydrochloric Acid (12M) (g) | 5.43 | 5.43 | — | — |
| Sodium Hydroxide (g) | 2.62 | 2.62 | | |
| Sodium picosulfate (g) | 0.010 | 0.010 | 0.010 | 0.010 |
| pH | 4.8 | 4.8 | 4.9 | 4.9 |

Preparation for Formulations D and E (Table 9):

Liquid formulations containing sodium picosulfate, magnesium citrate, sodium carboxymethylcellulose and sodium gluconate were prepared as follows:
1. EDTA, and sodium benzoate were added into weighed purified water and mixed to dissolve.
2. Sodium carboxymethylcellulose (AQUALON® 7L2P) was added and the solution was mixed to dissolve.
3. Sodium gluconate and conc. HCl (12 M) were added, then citric and magnesium oxide, and the solution mixed to dissolve. The solution was mixed for about 15 h.
4. Flavor was added, and the solution was mixed to dissolve, then the pH was adjusted to 4.8 with HCl (12 M) and/or NaOH.
5. Measured the actual volume, and adjusted the volume to theoretical volume using QS water.
6. Added Sweetener (sodium saccharin) and sodium picosulfate, mixed to dissolve, then measured the final pH.

Preparation for Formulations F and G (Table 9):

Liquid formulations containing sodium picosulfate, magnesium citrate and malic acid were prepared as follows:
1. EDTA, and sodium benzoate were added into weighed purified water and mixed to dissolve.
2. Malic acid, citric acid and magnesium oxide were added and the solution was mixed to dissolve.
3. The solution was mixed for about 1 hour.
4. Added sucralose, acesulfame potassium and flavor. Mixed to dissolve.
5. Added sodium hydroxide, mixed to dissolve, and measured the pH of solution.
6. Added sodium picosulfate to solution, mixed to dissolve.
7. Actual volume of solution was measured, loss of water was adjusted with QS water.
8. Final solution was filtered using vacuum filtration method using a 0.22 μm PTFE membrane.

The samples were stored in a closed container at 40° C. and 75% relative humidity or at 25° C. and 60% relative humidity, and analyzed using the HPLC method described above. The results of the analysis are summarized in Table 10.

TABLE 10

Stability and Decomposition of Sodium Picosulfate/Magnesium Citrate Formulations Containing Sodium Carboxymethylcellulose/Sodium Gluconate or Malic Acid

| | | | Degradation Products | | |
|---|---|---|---|---|---|
| Storage Conditions | | Assay | Picosulfate Benzyl Alcohol (RRT 0.84) (Area ratio) | Compound RRT 1.35 (Area ratio) | Picosulfate Related Compound A (Area ratio) | Compound RRT 1.94 (Area ratio) |
| | | | Formulation D | | | |
| 40° C., 75% R.H. | Initial | 102.4 | — | — | — | — |
| | 1-month | 101.8 | — | 0.38 | 0.28 | — |
| | 2-month | 99.7 | 1.52 | 0.66 | 0.56 | — |
| | 3-month | 98.3 | 1.64 | 1.04 | 0.76 | — |
| | 6-month | 96.8 | 5.48 | 2.43 | 1.45 | 0.68 |
| 25° C., 60% R.H. | Initial | 102.4 | — | — | — | — |
| | 3-month | 102.1 | 0.31 | 0.16 | 0.09 | — |
| | 6-month | 102.1 | 1.35 | 0.33 | 0.19 | 0.09 |

TABLE 10-continued

Stability and Decomposition of Sodium Picosulfate/Magnesium Citrate Formulations Containing Sodium Carboxymethylcellulose/Sodium Gluconate or Malic Acid

| Storage Conditions | | Assay | Degradation Products | | | |
|---|---|---|---|---|---|---|
| | | | Picosulfate Benzyl Alcohol (RRT 0.84) (Area ratio) | Compound RRT 1.35 (Area ratio) | Picosulfate Related Compound A (Area ratio) | Compound RRT 1.94 (Area ratio) |
| Formulation E | | | | | | |
| 40° C., 75% R.H. | Initial | 105.4 | — | — | — | — |
| | 1-month | 105.1 | — | 0.41 | 0.28 | — |
| | 2-month | 103.2 | 1.36 | 0.71 | 0.55 | — |
| | 3-month | 102.4 | 1.68 | 1.02 | 0.84 | — |
| 25° C., 60% R.H. | Initial | 105.4 | — | — | — | — |
| | 3-month | 106.9 | 0.31 | 0.15 | 0.10 | — |
| Formulation F | | | | | | |
| 40° C., 75% R.H. | Initial | 100.7 | — | — | — | — |
| | 1-month | 98.9 | 0.46 | 0.25 | 0.34 | — |
| | 2-month | 98.7 | 1.22 | 0.41 | 0.63 | — |
| | 3-month | 97.8 | 1.65 | 0.65 | 0.95 | 0.28 |
| | 6-month | 94.9 | 3.15 | 1.17 | 1.73 | 0.33 |
| 25° C., 60% R.H. | Initial | 100.7 | — | — | — | — |
| | 3-month | 100.0 | 0.28 | 0.15 | 0.14 | 0.05 |
| | 6-month | 98.9 | 0.56 | 0.20 | 0.26 | — |
| | 9-month | 99.7 | 0.75 | 0.21 | 0.34 | 0.07 |
| | 12-month | 99.8 | 1.01 | 0.29 | 0.48 | 0.08 |
| Formulation G | | | | | | |
| 40° C., 75% R.H. | Initial | 99.3 | — | — | — | — |
| | 1-month | 97.5 | 0.46 | 0.26 | 0.33 | — |
| | 2-month. | 97.3 | 1.24 | 0.45 | 0.61 | — |
| | 3-month | 96.1 | 1.66 | 0.70 | 0.90 | 0.27 |
| | 6-month | 93.3 | 3.15 | 1.23 | 1.68 | 0.36 |
| 25° C., 60% R.H. | Initial | 99.3 | — | — | — | — |
| | 3-month | 99.1 | 0.30 | 0.14 | 0.14 | 0.05 |
| | 6-month | 97.9 | 0.60 | 0.21 | 0.23 | — |

Examples 1-5. Stabilized Sodium Picosulfate/Magnesium Citrate Formulations Containing an Antioxidant, Sodium Carboxymethylcellulose and Sodium Gluconate and Reference Example H (Control)

Formulations containing sodium picosulfate, magnesium citrate and sodium carboxymethylcellulose/sodium gluconate were prepared having the compositions shown in Table 11.

TABLE 11

Sodium Picosulfate/Magnesium Citrate Formulations Containing Sodium Carboxymethylcellulose/Sodium Gluconate

| Formulation | H | 1 | 2 | 3 | 4 | 5 |
|---|---|---|---|---|---|---|
| Water (g) | 138.6 | 138.6 | 138.6 | 138.6 | 138.6 | 138.6 |
| Na-CMC (AQUALON ® 7L2P) (g) | 0.750 | 0.750 | 0.750 | 0.750 | 0.750 | 0.750 |
| Sodium Gluconate (g) | 10.64 | 10.64 | 10.64 | 10.64 | 10.64 | 10.64 |
| Citric acid (g) | 12.00 | 12.00 | 12.00 | 12.00 | 12.00 | 12.00 |
| Magnesium oxide (g) | 3.50 | 3.50 | 3.50 | 3.50 | 3.50 | 3.50 |
| Na-saccharin (g) | 0.20 | 0.20 | 0.20 | 0.20 | 0.20 | 0.20 |
| Sodium benzoate (g) | 0.09 | 0.09 | 0.09 | 0.09 | 0.09 | 0.09 |
| Berry Flavor (g) | — | 0.120 | 0.120 | 0.120 | 0.120 | 0.120 |
| Orange Flavor(g) | 0.060 | — | — | — | — | — |
| EDTA (g) | 0.210 | 0.210 | 0.210 | 0.210 | 0.210 | 0.210 |
| Ascorbic Acid (g) | — | 0.16 | 0.48 | — | — | — |
| Sodium Metabisulfite (g) | — | — | — | 0.16 | 0.32 | — |

TABLE 11-continued

Sodium Picosulfate/Magnesium Citrate Formulations Containing Sodium Carboxymethylcellulose/Sodium Gluconate

| Formulation | H | 1 | 2 | 3 | 4 | 5 |
|---|---|---|---|---|---|---|
| Potassium Metabisulfite | — | — | — | — | — | 0.16 |
| HCl (12M) (g) | 5.43 | 5.43 | 5.43 | 5.43 | 5.43 | 5.43 |
| NaOH (g) | 2.65 | 2.76 | 2.81 | 2.76 | 2.77 | 2.76 |
| Sodium Picosulfate (g) | 0.01 | 0.01 | 0.01 | 0.01 | 0.01 | 0.01 |
| pH | 4.85 | 4.87 | 4.87 | 4.90 | 4.91 | 4.9 |

Preparation for Formulations H, and 1-5 (Table 11):

Liquid formulations containing sodium picosulfate, magnesium citrate, sodium carboxymethylcellulose and sodium gluconate were prepared as follows:

1. EDTA and sodium benzoate were added into weighed purified water and mixed to dissolve.
2. Added sodium carboxymethylcellulose (AQUALON® 7L2P), and mixed to dissolve.
3. Added sodium gluconate and conc. HCl (12 M), then added citric and magnesium oxide, mixed to dissolve. Solution was mixed for about 1 hours.
4. Added flavor and sodium saccharin, mixed to dissolve.
5. Added sodium hydroxide, mixed to dissolve and measure pH of solution.
6. Measured the actual volume, and adjusted to theoretical value using QS water.
7. Filtered the solution by vacuum filtration process using 0.22 μm PTFE membrane.
8. Added anti-oxidant (ascorbic acid, sodium metabisulfite or potassium metabisulfite) mixed to dissolve, measured the pH again.
9. Added Na picosulfate, mixed to dissolve.

Note: The mixing process was carried out under nitrogen (nitrogen was sparged during preparation of the solution).

The samples were stored in a closed container at 55° C. in a dry heat oven, or in a closed container in an accelerated stability chamber at 40° C. and 75% relative humidity or at 25° C. and 60% relative humidity, and analyzed using the HPLC method described above. The results of the analysis are summarized in Table 12.

TABLE 12

Stability and Decomposition of Sodium Picosulfate/Magnesium Citrate Formulations Containing Sodium Carboxymethylcellulose/Sodium Gluconate

| Storage Conditions | | Assay | Picosulfate Benzyl Alcohol RRT 0.84 (Area %) | Compound RRT 1.35 (Area %) | Picosulfate Related Compound A (Area %) | Compound RRT 1.94 (Area %) | Bisacodyl Related Compound A (Area %) |
|---|---|---|---|---|---|---|---|
| Formulation H | | | | | | | |
| 55° C. | Initial | 102.3 | — | — | — | — | — |
| | 1 week | 101.8 | 1.08 | 0.28 | 0.58 | 0.10 | — |
| | 2 weeks | 100.2 | 2.03 | 0.64 | 1.10 | 0.19 | — |
| 40° C., 75% R.H. | Initial | 102.3 | — | — | — | — | — |
| | 1-month | 102.3 | 0.57 | 0.31 | 0.29 | 0.11 | — |
| | 2-month | 100.1 | 1.27 | 0.89 | 0.53 | 0.20 | — |
| | 3-month | 97.2 | 3.18 | 1.38 | 0.82 | 0.28 | — |
| | 6-month | 97.1 | 3.08 | 2.97 | 1.55 | 0.52 | 0.12 |
| 25° C., 60% R.H. | Initial | 102.3 | — | — | — | — | — |
| | 3-month | 100.8 | 0.58 | 0.28 | 0.10 | 0.06 | — |
| Formulation 1 | | | | | | | |
| 55° C. | Initial | 100.7 | — | 0.07 | — | 0.20 | — |
| | 1 week | 101.1 | — | 0.09 | 0.43 | 0.29 | — |
| | 2 weeks | 100.7 | — | 0.03 | 1.11 | 0.28 | — |
| | 3 weeks | 101.5 | — | 0.04 | 1.48 | 0.66 | — |
| 40° C., 75% R.H. | Initial | 100.7 | — | 0.07 | — | 0.20 | — |
| | 1-month | 101.1 | — | — | 0.32 | 0.23 | 0.07 |
| | 2-month | 100.5 | — | — | 0.50 | 0.11 | — |
| | 3-month | 98.2 | — | — | 0.83 | 0.38 | — |
| | 6-month | 96.9 | 0.74 | 0.54 | 1.31 | 0.49 | — |
| 25° C., 60% R.H. | Initial | 100.7 | — | — | — | — | — |
| | 3-month | 97.0 | — | — | 0.22 | 0.70 | — |
| | 6-month | 99.5 | 0.22 | 0.26 | 0.25 | 0.36 | — |
| Formulation 2 | | | | | | | |
| 55° | Initial | 99.5 | — | 0.07 | — | 0.14 | — |
| | 1 week | 99.9 | — | 0.10 | 0.48 | 0.33 | — |
| | 2 weeks | 99.8 | — | 0.04 | 1.29 | 0.49 | — |
| | 3 weeks | 101.9 | — | 0.14 | 1.71 | 0.91 | — |

TABLE 12-continued

Stability and Decomposition of Sodium Picosulfate/Magnesium Citrate
Formulations Containing Sodium Carboxymethylcellulose/Sodium Gluconate

| Storage Conditions | | Assay | Degradation Products | | | | |
|---|---|---|---|---|---|---|---|
| | | | Picosulfate Benzyl Alcohol RRT 0.84 (Area %) | Compound RRT 1.35 (Area %) | Picosulfate Related Compound A (Area %) | Compound RRT 1.94 (Area %) | Bisacodyl Related Compound A (Area %) |
| 40° C., 75% R.H. | Initial | 99.5 | — | 0.07 | — | 0.14 | — |
| | 1-month | 99.9 | — | — | 0.33 | 0.37 | — |
| | 2-month | 98.9 | — | — | 0.53 | 0.18 | — |
| | 3-month | 95.7 | — | — | 0.63 | 0.30 | — |
| | 6-month | 96.0 | 1.18 | 0.63 | 0.81 | 0.39 | — |
| 25° C., 60% R.H. | Initial | 99.5 | — | 0.07 | — | 0.14 | — |
| | 3-month | 95.6 | — | — | 0.24 | 0.31 | — |
| | 6-month | 97.8 | 0.29 | 0.26 | 0.30 | 0.24 | — |
| Formulation 3 | | | | | | | |
| 55° C. | Initial | 100.3 | — | — | — | — | — |
| | 1 week | 100.4 | 0.44 | — | 0.43 | — | — |
| | 2 weeks | 101.2 | 0.43 | — | 0.91 | — | — |
| | 3 weeks | 100.0 | 0.65 | — | 1.27 | — | — |
| 40° C., 75% R.H. | Initial | 100.3 | — | — | — | — | — |
| | 1-month | 101.2 | 0.26 | — | 0.23 | — | — |
| | 2-month | 98.8 | 0.56 | — | 0.44 | — | — |
| | 3-month | 99.3 | 1.02 | 0.02 | 0.70 | — | — |
| | 6-month | 98.5 | 2.23 | — | 1.37 | — | — |
| 25° C., 60% R.H. | Initial | 100.3 | — | — | — | — | — |
| | 3-month | 101.4 | 0.28 | 0.02 | 0.10 | — | — |
| | 6-month | 103.2 | 0.48 | — | 0.21 | — | 0.06 |
| Formulation 4 | | | | | | | |
| 55° C. | Initial | 101.0 | — | — | — | — | — |
| | 1 week | 101.0 | 0.30 | — | 0.43 | — | — |
| | 2 weeks | 101.8 | 0.27 | — | 0.84 | — | — |
| | 3 weeks | 100.6 | 0.40 | — | 1.24 | — | — |
| 40° C., 75% R.H. | Initial | 101.0 | — | — | — | — | — |
| | 1-month | 102.1 | 0.18 | — | 0.23 | — | — |
| | 2-month | 100.3 | 0.42 | — | 0.46 | — | — |
| | 3-month | 99.7 | 0.71 | 0.02 | 0.69 | — | — |
| | 6-month | 99.7 | 1.47 | — | 1.41 | — | — |
| 25° C., 60% R.H. | Initial | 101.0 | — | — | — | — | — |
| | 3-month | 101.5 | 0.20 | 0.05 | 0.12 | — | — |
| | 6-month | 103.2 | 0.31 | — | 0.21 | — | 0.05 |
| Formulation 5 | | | | | | | |
| 55° C. | Initial | 103.0 | — | — | — | — | — |
| | 1 week | 101.2 | — | — | 0.43 | — | — |
| | 2 weeks | 102.0 | 0.53 | — | 0.86 | — | — |
| | 3 weeks | 100.5 | 0.72 | — | 1.25 | — | — |
| 40° C., 75% R.H. | Initial | 103.0 | — | — | — | — | — |
| | 1-month | 102.7 | 0.27 | — | 0.24 | — | — |
| | 2-month | 101.1 | 0.60 | — | 0.45 | — | — |
| | 3-month | 99.6 | 1.27 | 0.05 | 0.74 | — | — |
| | 6-month | 99.9 | 2.53 | 0.05 | 1.44 | — | — |
| 25° C., 60% R.H. | Initial | 103.0 | — | — | — | — | — |
| | 3-month | 103.0 | 0.28 | 0.02 | 0.10 | — | — |
| | 6-month | 104.5 | 0.42 | — | 0.18 | — | 0.08 |

The results showed that each of the anti-oxidants ascorbic acid, sodium metabisulfite and potassium metabisulfite were effective to reduce the formation of the degradation products Picosulfate Benzyl Alcohol, Compound RRT 1.35 and Compound RRT 1.94, in formulations containing sodium carboxymethylcellulose and sodium gluconate, as well as the overall amount of degradation. The stability of the anti-oxidant-stabilized formulations containing sodium carboxymethylcellulose and sodium gluconate was superior to those containing malic acid (compare Examples 6-10 and Table 13).

Examples 6-10. Stabilized Sodium Picosulfate/Magnesium Citrate Formulations and Reference Example J (Control)

Formulations containing sodium picosulfate and magnesium citrate were prepared having the compositions shown in Table 13.

TABLE 13

Sodium Picosulfate/Magnesium Citrate Formulations Containing Malic Acid

| Formulation | J | 6 | 7 | 8 | 9 | 10 |
|---|---|---|---|---|---|---|
| Water (g) | 145.5 | 146.73 | 146.73 | 146.73 | 146.73 | 146.73 |
| Malic acid | 8.38 | 8.38 | 8.38 | 8.38 | 8.38 | 8.38 |
| Citric acid (g) | 12.00 | 12.00 | 12.00 | 12.00 | 12.00 | 12.00 |
| Magnesium oxide (g) | 3.50 | 3.50 | 3.50 | 3.50 | 3.50 | 3.50 |
| Sucralose | 0.20 | 0.20 | 0.20 | 0.20 | 0.20 | 0.20 |
| Acesulfame Potassium | 0.20 | 0.20 | 0.20 | 0.20 | 0.20 | 0.20 |
| Sodium benzoate (g) | 0.09 | 0.09 | 0.09 | 0.09 | 0.09 | 0.09 |
| Berry Flavor (g) | 0.12 | 0.12 | 0.12 | 0.12 | 0.12 | 0.12 |
| EDTA (g) | 0.21 | 0.21 | 0.21 | 0.21 | 0.21 | 0.21 |
| Ascorbic Acid (g) | — | 0.16 | 0.48 | — | — | — |
| Sodium Metabisulfite (g) | — | — | — | 0.16 | 0.32 | — |
| Potassium Metabisulfite (g) | — | — | — | — | — | 0.16 |
| NaOH (g) | 4.56 | 4.56 | 4.56 | 4.56 | 4.56 | 4.56 |
| Sodium Picosulfate (g) | 0.010 | 0.010 | 0.010 | 0.010 | 0.010 | 0.010 |
| pH | 4.92 | 4.93 | 4.84 | 4.85 | 4.83 | 4.91 |

Preparation of Formulations J and 6-10

Liquid formulations containing sodium picosulfate, magnesium citrate and malic acid were prepared as follows:
1 EDTA, and sodium benzoate were added into weighed purified water and mixed to dissolve.
2 Added malic acid, citric acid and magnesium oxide, mixed to dissolve.
3 Continued stirring solution for about 1 hour.
4 Added sucralose, acesulfame potassium and flavor. Mixed to dissolve.
5 Added sodium hydroxide, mixed to dissolve. Measured the pH of solution.
6 Measured the actual volume, and adjusted to theoretical value using QS water.
7 Filtered the solution by vacuum filtration process using 0.22 µm PTFE membrane.
8 Added anti-oxidant (ascorbic acid, sodium metabisulfite or potassium metabisulfite) and mixed to dissolve, and measured the pH again.
9 Added sodium picosulfate, mixed to dissolve.
Note: The mixing process was carried out under nitrogen (nitrogen was sparged during preparation of the solution).

The samples were stored in a closed container in a dry heat oven at 55° C., or in a closed container in an accelerated stability chamber at 40° C. and 75% relative humidity or at 25° C. and 60% relative humidity, and analyzed using the HPLC method described above. The results of the analysis are summarized in Table 14.

TABLE 14

Stability and Decomposition of Sodium Picosulfate/Magnesium Citrate Formulations Containing Malic Acid

| | | | Degradation Products | | | |
|---|---|---|---|---|---|---|
| Storage Conditions | | Assay | Unknown A (RTT 0.84) (Area %) | Compound RRT 1.35 (Area %) | Picosulfate Related Compound A (Area %) | Compound RRT 1.94 (Area %) |
| Formulation J | | | | | | |
| 55° C. | Initial | 100.9 | — | — | — | — |
| | 1 week | 100.3 | 0.77 | 0.22 | 0.74 | — |
| | 2 weeks | 101.9 | 1.76 | 0.17 | 1.48 | 0.09 |
| 40° C., 75% R.H. | Initial | 100.9 | — | — | — | — |
| | 1-month | 100.4 | 0.32 | 0.14 | 0.32 | — |
| | 2-month | 99.9 | 1.42 | 0.42 | 0.69 | — |
| | 3-month | 98.0 | 2.01 | 1.05 | 0.41 | 0.14 |
| | 6-month | 95.9 | 3.31 | 1.94 | 0.90 | 0.16 |
| 25° C., 60% R.H. | Initial | 100.9 | — | — | — | — |
| | 3-month | 101.4 | 0.36 | 0.12 | 0.11 | 0.06 |
| | 6-month | 100.8 | 0.49 | 0.24 | 0.23 | — |
| Formulation 6 | | | | | | |
| 55° C. | Initial | 98.8 | — | 0.11 | 0.04 | — |
| | 1 week | 97.6 | — | 0.05 | 1.17 | — |
| | 2 weeks | 95.4 | — | 0.05 | 1.90 | — |
| | 3 weeks | 96.4 | — | — | 2.61 | 0.68 |

TABLE 14-continued

Stability and Decomposition of Sodium Picosulfate/Magnesium Citrate Formulations Containing Malic Acid

| | | | Degradation Products | | | |
|---|---|---|---|---|---|---|
| Storage Conditions | | Assay | Unknown A (RTT 0.84) (Area %) | Compound RRT 1.35 (Area %) | Picosulfate Related Compound A (Area %) | Compound RRT 1.94 (Area %) |
| 40° C., 75% R.H. | Initial | 98.8 | — | 0.11 | — | 0.46 |
| | 1-month | 98.9 | — | — | 0.52 | 0.46 |
| | 2-month | 97.3 | — | — | 0.99 | 0.40 |
| | 3-month | 98.2 | — | 0.15 | 1.26 | 0.54 |
| | 6-month | 85.1 | — | — | 2.61 | 0.50 |
| 25° C., 60% R.H. | Initial | 98.8 | — | 0.11 | — | — |
| | 3-month | 95.7 | — | 0.30 | 1.83 | 1.06 |
| | 6-month | 95.2 | — | — | 0.67 | 1.11 |
| | | | Formulation 7 | | | |
| 55° C. | Initial | 97.7 | — | 0.09 | 0.06 | — |
| | 1 week | 96.2 | — | 0.06 | 1.15 | — |
| | 2 weeks | 95.3 | — | 0.05 | 1.96 | — |
| | 3 weeks | 96.0 | — | — | 2.59 | — |
| 40° C., 75% R.H. | Initial | 97.7 | — | 0.09 | 0.06 | 0.40 |
| | 1-month | 97.6 | — | — | 0.50 | 0.48 |
| | 2-month | 89.4 | — | 0.34 | 1.79 | 1.05 |
| | 3-month | 93.7 | — | 0.23 | 1.64 | 0.94 |
| | 6-month | 79.9 | — | — | 2.85 | 0.91 |
| 25° C., 60% R.H. | Initial | 97.7 | — | 0.09 | 0.06 | — |
| | 3-month | 94.0 | — | 0.29 | 0.81 | 0.77 |
| | 6-month | 93.3 | — | — | 0.91 | 0.67 |
| | | | Formulation 8 | | | |
| 55° C. | Initial | 100.3 | — | — | 0.13 | — |
| | 1 week | 99.3 | 0.32 | — | 0.81 | — |
| | 2 weeks | 99.2 | 0.60 | — | 1.64 | — |
| | 3 weeks | 98.7 | 0.69 | — | 2.37 | — |
| 40° C., 75% R.H. | Initial | 100.3 | — | — | 0.13 | — |
| | 1-month | 101.9 | 0.39 | — | 0.44 | — |
| | 2-month | 99.4 | 0.60 | — | 1.00 | — |
| | 3-month | 100.1 | 0.79 | 0.06 | 1.33 | — |
| | 6-month | 93.6 | 3.00 | 0.14 | 2.95 | — |
| 25° C., 60% R.H. | Initial | 100.3 | — | — | 0.13 | — |
| | 3-month | 100.6 | 0.35 | 0.06 | 0.37 | — |
| | 6-month | 99.6 | 0.85 | 0.11 | 0.69 | — |
| | | | Formulation 9 | | | |
| 55° C. | Initial | 100.9 | — | — | 0.04 | — |
| | 1 week | 98.8 | 0.21 | — | 0.79 | — |
| | 2 weeks | 98.9 | 0.40 | — | 1.56 | — |
| | 3 weeks | 97.0 | 0.37 | — | 2.27 | — |
| 40° C., 75% R.H. | Initial | 100.9 | — | — | 0.04 | — |
| | 1-month | 100.2 | 0.20 | — | 0.40 | — |
| | 2-month | 97.2 | 0.50 | — | 1.04 | — |
| | 3-month | 97.8 | 0.67 | 0.07 | 1.41 | — |
| | 6-month | 93.0 | 1.95 | 0.14 | 3.01 | — |
| 25° C., 60% R.H. | Initial | 100.9 | — | — | 0.04 | — |
| | 3-month | 99.7 | 0.16 | 0.04 | 0.25 | — |
| | 6-month | 99.7 | 0.39 | — | 0.47 | — |
| | 9-month | 98.8 | 0.55 | 0.09 | 0.70 | — |
| | 12-month | 93.1 | 0.95 | 0.12 | 1.03 | — |
| | | | Formulation 10 | | | |
| 55° C. | Initial | 99.5 | — | — | — | — |
| | 1 week | 98.2 | 0.34 | — | 0.91 | — |
| | 2 weeks | 96.6 | 0.36 | — | 1.61 | — |
| | 3 weeks | 97.2 | 0.36 | — | 1.61 | — |
| 40° C., 75% R.H. | Initial | 99.5 | — | — | — | — |
| | 1-month | 99.8 | 0.36 | — | 0.51 | — |
| | 2-month | 96.3 | 0.58 | 0.06 | 1.06 | — |
| | 3-month | 96.3 | 0.88 | 0.11 | 1.52 | — |
| | 6-month | 91.9 | 3.26 | 0.20 | 2.98 | 0.07 |
| 25° C., 60% R.H. | Initial | 99.5 | — | — | — | — |
| | 3-month | 98.4 | 0.43 | 0.11 | 0.43 | — |
| | 6-month | 97.7 | 0.89 | 0.11 | 0.69 | — |

The results showed that the anti-oxidants sodium metabisulfite and potassium metabisulfite were effective to reduce the initial rate of formation of the degradation products Picosulfate Benzyl Alcohol, Compound RRT 1.35 and Compound RRT 1.94, in formulations containing sodium carboxymethylcellulose and malic acid.

Examples 11-15. Stabilized Sodium Picosulfate/Magnesium Citrate Formulations Containing a Water-Soluble Antioxidant, and Malic Acid Formulations containing sodium picosulfate, magnesium citrate and malic acid (formulations 11-15) were prepared having the compositions shown in Table 15.

TABLE 15

Formulations with Water Soluble Anti-Oxidants

| Ingredients | Amount per unit dose (g) | | | | |
|---|---|---|---|---|---|
| | 11 | 12 | 13 | 14 | 15 |
| Purified Water | 147.28 | 147.34 | 147.08 | 147.45 | 147.30 |
| Disodium Edetate (EDTA) | 0.21 | 0.21 | 0.21 | 0.21 | 0.21 |
| Sodium Benzoate | 0.09 | 0.09 | 0.09 | 0.09 | 0.09 |
| Malic Acid, d, l | 8.38 | 8.38 | 8.38 | 8.38 | 8.38 |
| Citric Acid, Anhydrous | 12.00 | 12.00 | 12.00 | 12.00 | 12.00 |
| Magnesium Oxide** | 3.63 | 3.63 | 3.63 | 3.63 | 3.63 |
| Sodium Picosulfate | 0.01 | 0.01 | 0.01 | 0.01 | 0.01 |
| Sucralose | 0.20 | 0.20 | 0.20 | 0.20 | 0.20 |
| Acesulfame Potassium | 0.20 | 0.20 | 0.20 | 0.20 | 0.20 |
| Cranberry Flavor | 0.12 | 0.12 | 0.12 | 0.12 | 0.12 |
| Sodium Hydroxide (pellets) | 4.56 | 4.56 | 4.56 | 4.56 | 4.56 |
| Sodium Metabisulfite | 0.32 | — | — | — | — |
| Histidine | — | 0.261 | 0.522 | — | — |
| D-Mannose | — | — | — | 0.152 | 0.303 |
| TOTAL | 177.00 | 177.00 | 177.00 | 177.00 | 177.00 |

**Assay and LOI corrected amount. Theoretical MgO amount: 3.50 g/Unit Dose

Preparation of Formulations 11-15

Liquid formulations containing a water-soluble antioxidant, sodium picosulfate, magnesium citrate and malic acid were prepared as follows.

To prepare formulations with different anti-oxidants, a common base solution was prepared with 25% less purified water than theoretical weight and without sodium picosulfate and anti-oxidant. To accommodate different levels of anti-oxidants and solubilizers, the base solutions were prepared using 25% less purified water. The final unit dose weight of all formulations was fixed to 177 g, by adjusting the quantity of water during preparation. Nitrogen was used to purge all solutions during preparations and bottle filling.

The base solution was prepared as follows:

1 Purified water (~25% less than theoretical amount) was added into a suitable container equipped with propeller mixer.
2 Edetate disodium (EDTA), sodium benzoate, and malic acid was added, and mixed to dissolve.
3 Anhydrous citric acid was added, and mixed to dissolve.
4 Magnesium oxide was added, and mixed to dissolve. The resulting solution was additionally mixed for 20-25 minutes.
5 After observing that the solution temperature was ≤30° C., sucralose, acesulfame potassium, and cranberry flavor were added, and mixed to dissolve.
6 Sodium hydroxide pellets were added, and mixed to dissolve.
7 After observing that the solution temperature was ≤30° C., the pH of the solution was measured.
8 The solution was vacuum filtered using a 0.2 μm Polytetrafluoroethylene (PTFE) filter membrane.

Liquid formulations containing the water-soluble antioxidant, sodium picosulfate, magnesium citrate and malic acid were then prepared using the base solution as follows:

1 Anti-oxidant was added into purified water (~25% of theoretical amount), and mixed to dissolve.
2 The required amount of filtered base solution was added into a suitable container equipped with propeller mixer.
3 The anti-oxidant base solution was added slowly with mixing, and mixing of the resulting solution was continued.
4 The pH of the solution (target pH: 4.9 (range: 4.7-5.2) was measured. pH values were as shown in Table 16.
5 Required amount of placebo solution (without sodium picosulfate) was withdrawn for stability studies (approximately 88.5 g per unit dose).
6 Sodium picosulfate was added to the remaining solution, and mixed to dissolve.

TABLE 16 pH Values of Formulations Containing a Water-Soluble Anti-Oxidant (Prior to Addition of Sodium Picosulfate)

| Example | Anti-Oxidant | Amount | pH Value |
|---|---|---|---|
| 11 | Sodium Metabisulfite | 0.320 g | 5.1 (5.10) |
| 12 | Histidine | 0.261 g | 5.1 (5.13) |
| 13 | Histidine | 0.522 g | 5.2 (5.17) |
| 14 | D-Mannose | 0.152 g | 5.1 (5.07) |
| 15 | D-Mannose | 0.303 g | 5.1 (5.05) |

The final solution of each anti-oxidant preparation was filled into PET bottles as below using a fill weight of 177 g.

A stability study was performed by storing bottles (with and without sodium picosulfate) into a dry heat oven at 55° C.±2° C. (stress condition) temperature. Samples were withdrawn after each time point (T=1 and 2 weeks) and submitted for assay and impurity analysis.

The physical stability (presence of precipitation and appearance) of the solutions prepared with different anti-oxidants was checked for all samples, after storage for approximately 12 days at ambient room temperature (~25° C.) beyond their 2 weeks storage at 55° C. (stress stability).

The observations indicated that all solutions were free from precipitation. The solutions with histidine (both levels) were found to be slightly yellow, whereas, all other solutions remained clear and colorless.

The chemical stability of sodium picosulfate from all solutions were checked by conducting a stress study at 55° C. up to 2 weeks. The results are summarized in Table 17.

TABLE 17

Stability of Sodium Picosulfate/Magnesium Citrate Formulations Containing a Water-Soluble Antioxidant, and Malic Acid

| Formulation | Storage time (weeks) | Reference (No anti-oxidant) | 11 | 12 | 13 | 14 | 15 |
|---|---|---|---|---|---|---|---|
| Assay (%) | 0 | 100.9 | 97.9 | 98.7 | 97.5 | 98.4 | 101.1 |
|  | 1 | 100.3 | 97.1 | 97.6 | 96.0 | 97.4 | 99.5 |
|  | 2 | 101.9 | 96.3 | 95.0 | 95.8 | 97.2 | 99.8 |
| % Degradation Products | | | | | | | |
| Picosulfate Related Compound A | 0 | — | — | — | — | — | — |
|  | 1 | 0.74 | 0.27 | 0.35 | 0.32 | 0.31 | 0.25 |
|  | 2 | 1.48 | 0.99 | 1.40 | 1.15 | 1.09 | 0.97 |
| Picosulfate Benzyl Alcohol | 0 | — | — | — | — | — | — |
|  | 1 | 0.77 | 0.14 | 0.31 | 0.28 | 0.32 | 0.27 |
|  | 2 | 1.76 | 0.37 | 0.82 | 0.84 | 0.90 | 0.77 |
| Compound RRT 1.35 | 0 | — | — | — | — | — | — |
|  | 1 | 0.22 | — | — | 0.14 | — | — |
|  | 2 | 0.17 | — | 0.35 | 0.42 | 0.26 | 0.22 |
| Compound RRT 1.94 | 0 | — | — | — | — | — | — |
|  | 1 | — | — | — | — | — | — |
|  | 2 | — | — | — | 0.11 | — | — |

The results showed that the anti-oxidants sodium metabisulfite, histidine, and mannose were effective to reduce the rate of formation of the degradation product Picosulfate Benzyl Alcohol in formulations containing sodium picosulfate, magnesium citrate and malic acid.

Examples 16-23. Stabilized Sodium Picosulfate/Magnesium Citrate Formulations Containing a Water-Insoluble Antioxidant, and Malic Acid Formulations containing sodium picosulfate, magnesium citrate and malic acid and various water-insoluble antioxidants (formulations 16-23) were prepared having the compositions shown in Table 18.

TABLE 18

Formulations with Water Insoluble Anti-Oxidants

| | Amount per unit dose (g) | | | | | | | |
|---|---|---|---|---|---|---|---|---|
| Ingredients | 16 | 17 | 18 | 19 | 20 | 21 | 22 | 23 |
| Purified Water | 127.56 | 127.53 | 139.58 | 139.57 | 139.02 | 138.93 | 141.42 | 141.24 |
| Disodium Edetate (EDTA) | 0.21 | 0.21 | 0.21 | 0.21 | 0.21 | 0.21 | 0.21 | 0.21 |
| Sodium Benzoate | 0.09 | 0.09 | 0.09 | 0.09 | 0.09 | 0.09 | 0.09 | 0.09 |
| Malic Acid, d, l | 8.38 | 8.38 | 8.38 | 8.38 | 8.38 | 8.38 | 8.38 | 8.38 |
| Citric Acid, Anhydrous | 12.00 | 12.00 | 12.00 | 12.00 | 12.00 | 12.00 | 12.00 | 12.00 |
| Magnesium Oxide** | 3.63 | 3.63 | 3.63 | 3.63 | 3.63 | 3.63 | 3.63 | 3.63 |
| Sodium Picosulfate | 0.01 | 0.01 | 0.01 | 0.01 | 0.01 | 0.01 | 0.01 | 0.01 |
| Sucralose | 0.20 | 0.20 | 0.20 | 0.20 | 0.20 | 0.20 | 0.20 | 0.20 |
| Acesulfame Potassium | 0.20 | 0.20 | 0.20 | 0.20 | 0.20 | 0.20 | 0.20 | 0.20 |
| Cranberry Flavor | 0.12 | 0.12 | 0.12 | 0.12 | 0.12 | 0.12 | 0.12 | 0.12 |
| Sodium Hydroxide (pellets) | 4.56 | 4.56 | 4.56 | 4.56 | 4.56 | 4.56 | 4.56 | 4.56 |
| Butylated Hydroxyanisole (BHA) | 0.04 | 0.08 | — | — | — | — | — | — |
| Butylated Hydroxytoluene (BHT) | — | — | 0.0152 | 0.0304 | — | — | — | — |

TABLE 18-continued

Formulations with Water Insoluble Anti-Oxidants

| | Amount per unit dose (g) | | | | | | | |
|---|---|---|---|---|---|---|---|---|
| Ingredients | 16 | 17 | 18 | 19 | 20 | 21 | 22 | 23 |
| α-Tocopherol (Vitamin E) | — | — | — | — | 0.084 | 0.168 | — | — |
| Propyl Gallate | — | — | — | — | — | — | 0.178 | 0.357 |
| Propylene Glycol | 20.00 | 20.00 | 8.00 | 8.00 | 8.00 | 8.00 | 6.00 | 6.00 |
| Polysorbate 80 | — | — | — | — | 0.50 | 0.50 | — | — |
| TOTAL | 177.00 | 177.00 | 177.00 | 177.00 | 177.00 | 177.00 | 177.00 | 177.00 |

**Assay and LOI corrected amount. Theoretical MgO amount: 3.50 g/Unit Dose.

Preparation of Formulations 16-23

Liquid formulations containing a water-insoluble antioxidants, sodium picosulfate, magnesium citrate and malic acid were prepared as follows.

A solubility study was conducted to evaluate solubilizers and/or surfactants for water insoluble anti-oxidants. Higher levels were tested to determine amount of solubilizer and/or surfactant required to solubilize them. The amounts of solubilizer and surfactant required to solubilize water insoluble antioxidants are provided in Table 19.

TABLE 19

Amount of Solubilizer and Surfactant Needed to Solubilize Various Water-Insoluble Antioxidants

| Antioxidant | Solubilizer/Surfactant Used | Amount per Unit Dose |
|---|---|---|
| BHT | Propylene glycol (solubilizer) | 8 |
| BHA | Propylene glycol (solubilizer) | 20 |
| Propyl Gallate | Propylene glycol (solubilizer) | 6 |
| α-Tocopherol | Propylene glycol (solubilizer) | 8 |
| | Polysorbate 80 (Surfactant) | 0.5 |

To prepare formulations with different anti-oxidants, a common base solution was prepared with 25% less purified water than theoretical weight and without sodium picosulfate and anti-oxidant. To accommodate different levels of anti-oxidants, and solubilizers the base solutions were prepared using 25% less purified water. The final unit dose weight of all formulations was fixed to 177 g, by adjusting the quantity of water during preparation. Nitrogen was used to purge all solutions during preparations and bottle filling.

The base solution was prepared as follows:
1. Purified water (~25% less than theoretical amount) was added into a suitable container equipped with propeller mixer.
2. Edetate disodium (EDTA), sodium benzoate, and malic acid were added, and mixed to dissolve.
3. Anhydrous citric acid was added, and mixed to dissolve.
4. Magnesium oxide was added, and mixed to dissolve. The resulting solution was additionally mixed for 20-25 minutes.
5. After observing that the solution temperature was ≤30° C., sucralose, acesulfame potassium, and cranberry flavor was added, and mixed to dissolve.
6. Sodium hydroxide pellets were added, and mixed to dissolve.
7. After observing that the solution temperature was ≤30° C., the pH of the solution was measured.
8. The solution was vacuum filtered using a 0.2 µm Polytetrafluoroethylene (PTFE) filter membrane.

Liquid formulations containing the water-insoluble antioxidant, sodium picosulfate, magnesium citrate and malic acid were then prepared using the base solution as follows:
1. The water insoluble anti-oxidant was solubilized into propylene glycol and/or polysorbate 80, then required amount of purified water (q.s.) was added, and mixed to obtain solution. Solubilizers were selected based on solubility studies.
2. The required amount of filtered base solution was added into a suitable container equipped with propeller mixer.
3. The anti-oxidant base solution was added slowly with mixing, and mixing of the resulting solution was continued.
4. The pH of the solution (target pH: 4.9 (range: 4.7-5.2) was measured. pH values were as shown in Table 20.
5. Required amount of placebo solution (without sodium picosulfate) was withdrawn for stability studies (approximately 88.5 g per unit dose).
6. Sodium picosulfate was added to the remaining solution, and mixed to dissolve.

TABLE 20 pH Values of Formulations Containing a Water-Soluble Anti-Oxidant (Prior to Addition of Sodium Picosulfate)

| Example | Anti-Oxidant | Amount | pH Value |
|---|---|---|---|
| 16 | BHA | 0.04 g | 5.1 (5.14) |
| 17 | BHA | 0.08 g | 5.2 (5.15) |
| 18 | BHT | 0.0152 g | 5.1 (5.10) |
| 19 | BHT | 0.0304 g | 5.1 (5.10) |
| 20 | Vitamin E | 0.084 g | 5.1 (5.10) |
| 21 | Vitamin E | 0.168 g | 5.1 (5.11) |
| 22 | Propyl Gallate | 0.178 g | 5.1 (5.09) |
| 23 | Propyl Gallate | 0.357 g | 5.1 (5.09) |

The final solution of each anti-oxidant preparation was filled into PET bottles as below using a fill weight of 177 g.

A stability study was performed by storing bottles (with and without sodium picosulfate) into a dry heat oven at 55° C.±2° C. (stress condition) temperature. Samples were withdrawn after each time point (T=1 and 2 weeks) and submitted for assay and impurity analysis.

The physical stability (presence of precipitation and appearance) of the solutions prepared with different anti-oxidants was checked for all samples, after storage for approximately 12 days at ambient room temperature (~25° C.) beyond their 2 weeks storage at 55° C. (stress stability).

The observations indicated that all solutions were free from precipitation. The solution containing higher amount (80 mg) of butylated hydroxyanisole (BHA) was found hazy in appearance, and solutions with propyl gallate (both levels) found slightly yellow, whereas, all other solutions remained clear and colorless.

The chemical stability of sodium picosulfate from all solutions were checked by conducting a stress study at 55° C. for up to 2 weeks. The results are summarized in Table 21.

TABLE 21

Stability of Sodium Picosulfate/Magnesium Citrate Formulations Containing a Water-Insoluble Antioxidant, and Malic Acid

| Test | Storage time (weeks) | Reference (no anti-oxidant) | 18 | 19 | 16 | 17 | 20 | 21 | 22 | 23 |
|---|---|---|---|---|---|---|---|---|---|---|
| Assay | 0 | 100.9 | 99.9 | 96.1 | 97.8 | 100.6 | 93.1 | 98.7 | 98.8 | 94.6 |
|  | 1 | 100.3 | 97.6 | 93.7 | 94.0 | 96.6 | 91.6 | 95.8 | 97.0 | 94.4 |
|  | 2 | 101.9 | 96.7 | 93.5 | 92.9 | 95.0 | 88.5 | 93.5 | 96.7 | 95.2 |
| % Degradation Products | | | | | | | | | | | |
| Picosulfate Related Compound A | 0 | — | — | — | — | — | — | — | — | — |
|  | 1 | 0.74 | 0.45 | 0.45 | 0.50 | 0.44 | 0.60 | 0.59 | 0.38 | 0.39 |
|  | 2 | 1.48 | 1.53 | 1.58 | 1.74 | 1.52 | 2.51 | 2.42 | 1.36 | 1.40 |
| Picosulfate Benzyl Alcohol | 0 | — | — | — | — | — | — | — | — | — |
|  | 1 | 0.77 | 0.38 | 0.38 | 0.20 | 0.17 | 0.26 | 0.21 | 0.36 | 0.37 |
|  | 2 | 1.76 | 0.99 | 1.02 | 0.65 | 0.66 | 0.92 | 0.83 | 0.99 | 1.01 |
| Compound RRT 1.35 | 0 | — | — | — | — | — | — | — | — | — |
|  | 1 | 0.22 | 0.15 | 0.14 | 0.34 | 0.38 | 0.20 | 0.24 | 0.13 | 0.15 |
|  | 2 | 0.17 | 0.47 | 0.47 | 1.10 | 1.49 | 0.51 | 0.67 | 0.38 | 0.36 |
| Compound RRT 1.94 | 0 | — | — | — | — | — | — | — | — | — |
|  | 1 | — | — | — | — | — | — | — | — | — |
|  | 2 | — | — | — | 0.21 | 0.32 | 0.10 | 0.12 | — | — |

The results showed that the anti-oxidants BHT, BHA, propyl gallate, α-tocopherol were effective to reduce the rate of formation of the degradation product Picosulfate Benzyl Alcohol in formulations containing sodium picosulfate, magnesium citrate and malic acid.

OTHER EMBODIMENTS

It is to be understood that while the invention has been described in conjunction with the detailed description thereof, the foregoing description is intended to illustrate and not limit the scope of the invention, which is defined by the scope of the appended claims. A number of embodiments of the invention have been described. Nevertheless, it will be understood that various modifications may be made without departing from the spirit and scope of the invention. Accordingly, other aspects, advantages, embodiments and modifications are within the scope of the following claims.

What is claimed is:

1. An oral, liquid pharmaceutical composition comprising:
   sodium picosulfate,
   magnesium oxide,
   citric acid,
   malic acid, and
   an antioxidant selected from potassium metabisulfite and sodium metabisulfite;
   wherein the antioxidant is present in the composition at a concentration of from about 0.002 M to about 0.1 M, and
   wherein the composition has a pH of from about 4.0 to about 6.5.

2. The composition of claim 1, wherein:
   the sodium picosulfate is present in the composition at a concentration of from about 0.10 mM to about 0.15 mM;
   the composition comprises magnesium and citrate in a molar ratio of from about 1:1 to about 1.5:1;
   the magnesium is present in the composition at a concentration of from about 0.2 M to about 0.8 M;
   the malic acid is present in the composition at a concentration in a range from about 0.01 M to about 5 M; and
   the antioxidant comprises sodium metabisulfite.

3. The composition of claim 1, wherein:
   the sodium picosulfate is present in the composition at a concentration of from about 0.12 mM to about 0.14 mM;
   the composition comprises magnesium and citrate in a molar ratio of about 1.4:1;
   the magnesium is present in the composition at a concentration of from about 0.5 M to about 0.6 M;
   the malic acid is present in the composition at a concentration in a range from about 0.1 M to about 1 M; and
   the antioxidant comprises sodium metabisulfite which is present in the composition at a concentration of from about 0.005 M to about 0.02 M.

4. The composition of claim 1, wherein the magnesium oxide and citric acid form magnesium citrate.

5. The composition of claim 1, further comprising a preservative agent selected from sodium benzoate and potassium benzoate.

6. The composition of claim 1, further comprising a chelating agent comprising disodium edetate (ETDA).

7. The composition of claim 1, wherein the composition has a pH of from about 4.5 to about 5.2.

8. The composition of claim 1, wherein the composition has a pH of from about 4.7 to about 4.9.

9. The composition of claim 1, wherein the composition has a pH of about 4.9.

10. The composition of claim 1, wherein, after storage for 1 year at a temperature of about 25° C. and about 60% relative humidity, the composition contains about 0.2% or less of Compound RRT 1.35, as measured by HPLC analysis area percentage relative to sodium picosulfate.

11. The composition of claim 1, wherein, after storage for 1 year at a temperature of about 25° C. and about 60% relative humidity, the composition contains about 0.1% or less of Compound RRT 1.35, as measured by HPLC analysis area percentage relative to sodium picosulfate.

12. The composition of claim 1, wherein, after storage for 1 year at a temperature of about 25° C. and about 60% relative humidity, the composition contains about 0.2% or less of Compound RRT 1.94, as measured by HPLC analysis area percentage relative to sodium picosulfate.

13. The composition of claim 1, wherein, after storage for 1 year at a temperature of about 25° C. and about 60% relative humidity, the composition contains about 0.1% or less of Compound RRT 1.94, as measured by HPLC analysis area percentage relative to sodium picosulfate.

14. The composition of claim 1, wherein, after storage for 1 year at a temperature of about 25° C. and about 60% relative humidity, the composition contains about 0.2% or less of Compound RRT 1.35 and about 0.2% or less of Compound RRT 1.94, as measured by HPLC analysis area percentage relative to sodium picosulfate.

15. The composition of claim 1, wherein, after storage for 1 year at a temperature of about 25° C. and about 60% relative humidity, the composition comprises less than about 1.5% Picosulfate Benzyl Alcohol, less than about 0.2% of Compound RRT 1.35, less than about 0.2% of Compound RRT 1.94, and less than about 1.5% of Picosulfate Related Compound A, as measured by HPLC analysis area percentage relative to sodium picosulfate.

* * * * *